United States Patent
Maruko et al.

(10) Patent No.: US 7,743,961 B2
(45) Date of Patent: Jun. 29, 2010

(54) TOOL FOR FRICTION STIR WELDING, METHOD OF WELDING WITH THE SAME, AND PROCESSED OBJECT OBTAINED BY THE SAME

(75) Inventors: Tomohiro Maruko, Tokyo (JP);
Toshiyuki Morino, Tokyo (JP);
Tomoaki Miyazawa, Tokyo (JP)

(73) Assignee: Furuya Metal Co., Ltd., Tokyo (JP)

( * ) Notice: Subject to any disclaimer, the term of this patent is extended or adjusted under 35 U.S.C. 154(b) by 0 days.

(21) Appl. No.: 12/281,632

(22) PCT Filed: Feb. 28, 2007

(86) PCT No.: PCT/JP2007/053802

§ 371 (c)(1),
(2), (4) Date: Sep. 4, 2008

(87) PCT Pub. No.: WO2007/102380

PCT Pub. Date: Sep. 13, 2007

(65) Prior Publication Data

US 2009/0068491 A1  Mar. 12, 2009

(30) Foreign Application Priority Data

Mar. 9, 2006  (JP) .............................. 2006-064814

(51) Int. Cl.
*B23K 20/12* (2006.01)
*B23K 37/00* (2006.01)
(52) U.S. Cl. ..................................... 228/112.1; 228/2.1
(58) Field of Classification Search ....................... None
See application file for complete search history.

(56) References Cited

U.S. PATENT DOCUMENTS

| 2005/0035173 | A1 |  | 2/2005 | Steel et al. |
| 2005/0129960 | A1 | * | 6/2005 | Liu et al. ..................... 428/427 |
| 2006/0032891 | A1 | * | 2/2006 | Flak et al. ................ 228/112.1 |
| 2006/0049234 | A1 | * | 3/2006 | Flak et al. ................ 228/112.1 |
| 2006/0081683 | A1 | * | 4/2006 | Packer et al. ............. 228/112.1 |

(Continued)

FOREIGN PATENT DOCUMENTS

JP            7 505090         6/1995

(Continued)

*Primary Examiner*—Kiley Stoner
(74) *Attorney, Agent, or Firm*—Oblon, Spivak, McClelland, Maier & Neustadt, L.L.P.

(57) ABSTRACT

It is an object of the invention to reduce mixing of an impurity from a friction stir welding tool, reduce abrasion of the tool, and prevent the tool from being easily broken even though an object to be worked formed by a metal or an alloy having a high melting point of 1350° C. or more is friction-stir-welded.

The friction stir welding tool according to the invention can friction-stir-weld a metal or alloy having a high melting point of 1350° C. or more as an object to be worked. At least a portion brought into contact with the object to be worked has a composition containing iridium, containing rhenium, ruthenium, molybdenum, tungsten, niobium, tantalum, rhodium, or two or more of them, and containing zirconium, hafnium, lanthanum, cerium, samarium, gadolinium, scandium, yttrium, or two or more of them, and has a Micro Vickers Hardness of 300 Hv or more.

22 Claims, 13 Drawing Sheets

U.S. PATENT DOCUMENTS

| | | | |
|---|---|---|---|
| 2006/0157531 A1* | 7/2006 | Packer et al. | 228/2.1 |
| 2006/0175382 A1* | 8/2006 | Packer et al. | 228/112.1 |
| 2008/0006678 A1* | 1/2008 | Packer et al. | 228/114.5 |

FOREIGN PATENT DOCUMENTS

| | | |
|---|---|---|
| JP | 9 508073 | 8/1997 |
| JP | 2004 90050 | 3/2004 |
| JP | 2004 195480 | 7/2004 |
| JP | 2006 320958 | 11/2006 |
| WO | WO 2004/007782 A1 | 1/2004 |

\* cited by examiner

TOOL FOR FRICTION STIR WELDING, METHOD OF WELDING WITH THE SAME, AND PROCESSED OBJECT OBTAINED BY THE SAME

TECHNICAL FIELD

The present invention a friction stir welding tool to friction-stir-weld a high-melting point member, a friction stir welding method, and a workpiece obtained by the friction stir welding method.

BACKGROUND ART

As a method of welding a metal, a technique of a friction stir welding method is disclosed (for example, see Patent Document 1 or 2). The friction stir welding method which brings objects to be worked into contact with each other or brings objects to be worked into almost contact with each other to regulate an elongate bonding region, moves a friction stir welding tool inserted into the bonding region while rotating the friction stir welding tool, and welds the objects to be worked by using frictional heat. The friction stir welding method is a welding method which can welds metals such as iron or aluminum alloy to each other but also different materials to each other.

As a friction stir welding method, welding for aluminum and an aluminum alloy each having a relatively low melting point is frequently examined. It is slightly reported that a friction stir welding method is applied by using a metal or an alloy having a high melting point of 1350° C. or more as a high melting point as an object to be worked. However, a technique which welds platinum having a high melting point is disclosed (for example, see Patent Document 3).

Patent Document 1: Japanese Patent Application National Publication (Laid-Open) No. 7-505090

Patent Document 2: Japanese Patent Application National Publication (Laid-Open) No. 9-508073

Patent Document 3: Japanese Patent Application Laid-Open (JP-A) No. 2004-090050

DISCLOSURE OF THE INVENTION

Problem to be Solved by the Invention

However, when an object to be worked having a high melting point is used, heat generated by friction between a friction stir welding tool and the object to be worked must be increased to a temperature higher than that generated when an object to be worked having a relatively low melting point such as aluminum or an aluminum alloy. Therefore, since the friction stir welding tool must weld an object to be worked having a high melting point and have a long life, the friction stir welding tool requires chemical stability, heat resistance, abrasion resistance, and thermal shock resistance which withstand a high temperature generated by friction.

Therefore, it is an object of the present invention to provide a friction stir welding tool which, even though an object to be worked containing a metal or an alloy having a high melting point of 1350° C. or more is friction-stir-welded, mixes a small amount of impurity, has small abrasion, and is difficult to be broken, and to stably realize friction stir welding by using the tool.

Means for Solving the Problem

The present inventors examined various compositions of material forming a friction stir welding tool. As a result, when the friction stir welding tool was formed by an alloy having a composition containing iridium and a predetermined element as a sub-component, it was found that an object to be worked having a high melting point could be stably friction-stir-welded, and the present invention could be completed. More specifically, the friction stir welding tool according to the present invention is a friction stir welding tool which can friction-stir-weld a metal or an alloy having a high melting point of 1350° C. or more as an object to be worked. At least a portion to be brought into contact with the object to be worked has a composition containing iridium, containing rhenium, ruthenium, molybdenum, tungsten, niobium, tantalum, rhodium, or two or more of them, and containing zirconium, hafnium, lanthanum, cerium, samarium, gadolinium, scandium, yttrium, or two or more of them and has a Micro Vickers Hardness of 300 Hv or more.

In the friction stir welding tool according to the present invention, the portion brought into contact with the object to be worked is preferably formed by a ternary alloy which contains iridium, 1.0 to 50.0 atomic percentages of rhenium or ruthenium, and 0.1 to 5.0 atomic percentages of zirconium, hafnium, lanthanum, cerium, samarium, gadolinium, scandium, or yttrium.

In the friction stir welding tool according to the present invention, the portion brought into contact with the object to be worked is preferably formed by a ternary alloy which contains iridium, 1.0 to 35.0 atomic percentages of molybdenum or tungsten, and 0.1 to 5.0 atomic percentages of zirconium, hafnium, lanthanum, cerium, samarium, gadolinium, scandium, or yttrium.

In the friction stir welding tool according to the present invention, the portion brought into contact with the object to be worked is preferably formed by a ternary alloy which contains iridium, 1.0 to 25.0 atomic percentages of niobium or tantalum, and 0.1 to 5.0 atomic percentages of zirconium, hafnium, lanthanum, cerium, samarium, gadolinium, scandium, or yttrium.

In the friction stir welding tool according to the present invention, the portion brought into contact with the object to be worked is preferably formed by a quaternary alloy which contains iridium, 1.0 to 50.0 atomic percentages of rhenium or ruthenium, 1.0 to 18.0 atomic percentages of rhodium, and 0.1 to 5.0 atomic percentages of zirconium, hafnium, lanthanum, cerium, samarium, gadolinium, scandium, or yttrium.

In the friction stir welding tool according to the present invention, the portion brought into contact with the object to be worked is preferably formed by a quaternary alloy which contains iridium, 1.0 to 35.0 atomic percentages of molybdenum or tungsten, 1.0 to 18.0 atomic percentages of rhodium, and 0.1 to 5.0 atomic percentages of zirconium, hafnium, lanthanum, cerium, samarium, gadolinium, scandium, or yttrium.

In the friction stir welding tool according to the present invention, the portion brought into contact with the object to be worked is preferably formed by a quaternary alloy which contains iridium, 1.0 to 25.0 atomic percentages of niobium or tantalum, 1.0 to 18.0 atomic percentages of rhodium, and 0.1 to 5.0 atomic percentages of zirconium, hafnium, lanthanum, cerium, samarium, gadolinium, scandium, or yttrium.

In the friction stir welding tool according to the present invention, the portion brought into contact with the object to be worked preferably contains at least iridium and rhodium, and a content of rhodium is preferably 1.0 to 18.0 atomic percentages. When the friction stir welding tool contains rhodium, not only mechanical abrasion but also high-temperature volatilization are suppressed to elongate the life of the tool.

In a friction stir welding method according to the present invention which brings objects to be worked into contact with each other or brings objects to be worked into almost contact with each other to regulate an elongate bonding region, moves a friction stir welding tool inserted into the bonding region while rotating the friction stir welding tool, and welds the objects to be worked, the objects to be worked are formed by a metal or an alloy having a high melting point of 1350° C. or more, and, as the friction stir welding tool, the friction stir welding tool according to the present invention is used.

In the friction stir welding method according to the present invention, welding is preferably performed while applying an iridium back plate, a back plate having a composition containing iridium and containing rhenium, ruthenium, molybdenum, tungsten, niobium, tantalum, rhodium, zirconium, hafnium, or two or more of them as sub-components, or a back plate coated with an iridium film or a film having the composition to a rear surface side of a pressing surface of the friction stir welding tool. Rear surface sides of the objects to be worked also increase to a considerably high temperature. Therefore, a back plate consisting of a material having chemical stability, heat resistance, and thermal shock resistance which can withstand the high temperature or a back plate coated with the film having the composition are applied to the friction stir welding tool to make it possible to prevent the back plate from being fused and prevent impurity from the back plate from being mixed.

Workpieces having friction stir welding portions according to the present invention are welded by the friction stir welding method.

EFFECT OF THE INVENTION

The present invention, with respect to the friction stir welding tool, even though objects to be worked formed by a metal or an alloy having a high melting point of 1350° C. or more are friction-stir-welded, an impurity mixed from the tool can be reduced, abrasion is reduced, and breakdown of the tool can be reduced. Stable friction stir welding can be realized by the tool.

Figure 1:
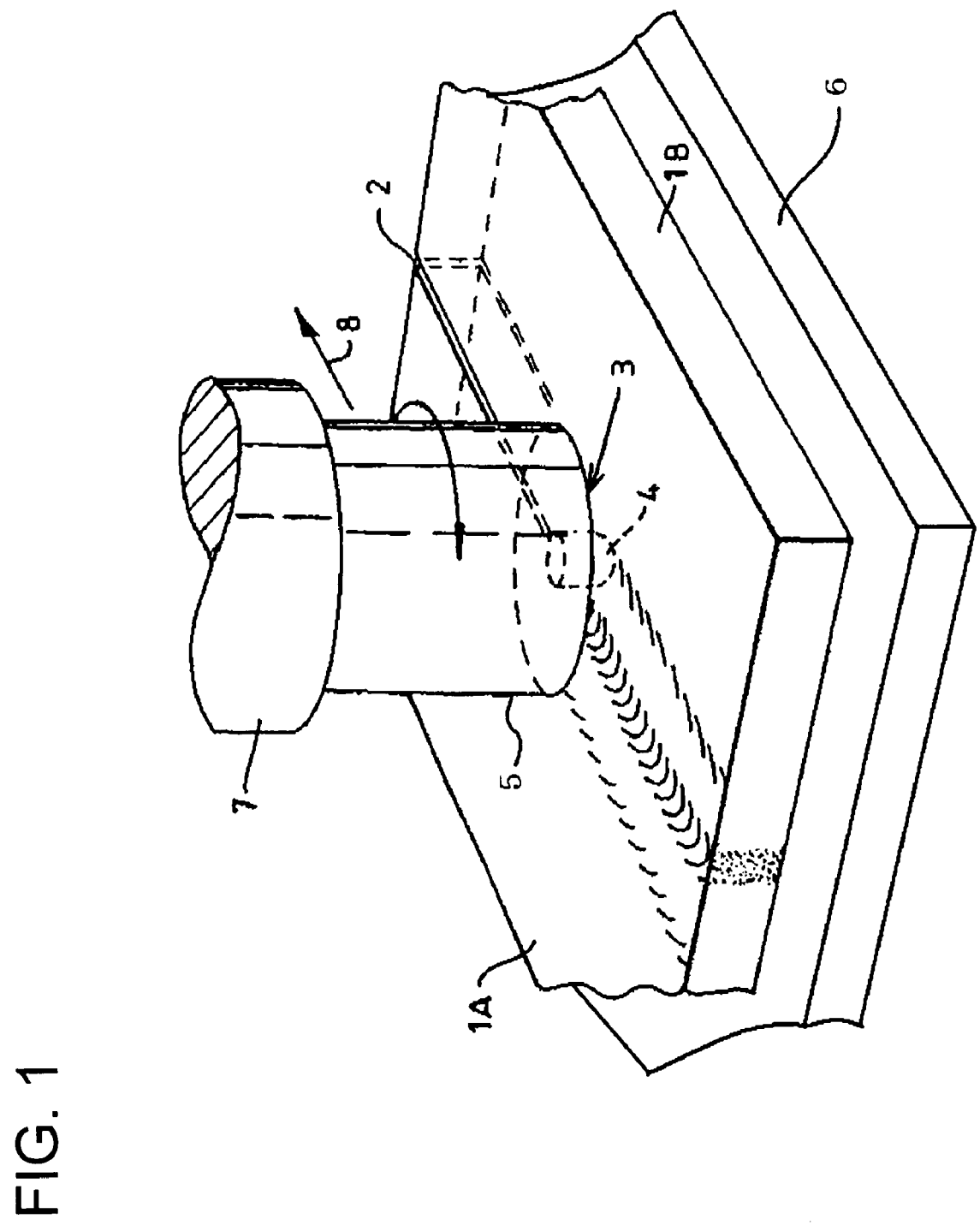
FIG. 1 is a conceptual diagram showing a conformation of a mechanism of a friction stir welding method.

REFERENCE NUMERALS 1A, 1B: Object to be worked, 2: Bonding region, 3: Friction stir welding tool (probe pin), 4: Pencil portion, 5: Shoulder portion, 6: Backplate, 7: Motor, 8: Moving direction.

BEST MODE FOR CARRYING OUT THE INVENTION

The present invention will be described below in detail. However, the present invention is not limited to the description. First, processes of a friction stir welding method and a friction stirring junction devices will be described below with reference to FIG. 1.

The friction stir welding method includes: the step of bringing objects to be worked 1A and 1B into contact with each other or bringing the objects to be worked 1A and 1B into almost contact with each other to regulate an elongate bonding region 2; the step of inserting a friction stir welding tool 3 into an bonding region 2 while being rotated to generate frictional heat between the friction stir welding tool 3 and the elongate bonding region 2; and the step of generating the plasticized region in bonding region which generates heat; and the step of welding the objects to be worked. After the welding, the friction stir welding tool 3 is removed from the bonding region 2.

The friction stir welding tool 3 includes a columnar shoulder portion 5 and a pencil portion 4 formed on an end face of the shoulder portion 5. The friction stir welding tool 3 is rotated by a motor 7. Since friction between the friction stir welding tool 3 and the objects to be worked 1A and 1B must be performed, the objects to be worked 1A and 1B must be brought into contact with each other. The objects to be worked may be brought into almost contact with each other under a condition in that the friction is performed. The bonding region 2 must be elongate to perform continuous welding without performing spot welding. When the bonding region 2 has a large space, friction between the friction stir welding tool 3 and the objects to be worked 1A and 1B is not performed. Furthermore, the friction stir welding tool 3 must withstand frictional heat, and must have a strength which can withstand torsional stress caused by rotation. A back plate 6 is arranged on rear surface sides of the objects to be worked 1A and 1B.

A principle of the friction stir welding method will be described below. The objects to be worked 1A and 1B are confronted with each other, the friction stir welding tool 3 is rotated, and the pencil portion 4 is slowly inserted into a confront line serving as the bonding region 2. At this time, an end face of the columnar shoulder portion 5 on which the pencil portion 4 is arranged and the surfaces of the objects to be worked 1A and 1B are brought into contact with each other. The length of the pencil portion 4 is set to be necessary for a welding depth. When the friction stir welding tool 3 is rotated and brought into contact with the bonding region 2, friction sharply heat a material at a contact point. As a result, the material is deteriorated in mechanical strength. When the force is further applied, the friction stir welding tool 3 kneads the material along a moving direction 8 and pushes out the material. In the bonding region 2, frictional heat generated by the rotating shoulder portion 5 and the rotating pencil portion 4 of the friction stir welding tool 3 creates a high-temperature plasticized region on the end face portion of the shoulder portion 5 and a metal around the pencil portion 4. When the objects to be worked 1A and 1B move in a direction opposite to the moving direction of the friction stir welding tool 3 or move in the moving direction, the plasticized metal is collapsed at the front end of the friction stir welding tool 3 in the moving direction 8 and move to the rear end by mechanical stirring, the shape of the friction stir welding tool 3, and a forging operation by a rotating direction. As a result, the welding portion on the front surface of the friction stir welding tool 3 is heated to create a plasticized region. An oxide film which is present on the object to be worked is broken, and the plasticized region is welded at the rear end of the friction stir welding tool 3 while stirring a collapsed metal.

The friction stir welding method has the following merits. Cracks do not occur, an alloy component can be intactly held without a loss of an alloy element caused by evaporation of a deposit metal, and a fine grain structure is formed in the deposit metal by injection, stirring, and a forging operation of the welding tool.

The friction stir welding tool 3 according to the embodiment is a friction stir welding tool which can friction-stir-weld a metal or an alloy having a high melting point of 1350° C. or more as an object to be worked, at least a portion brought into contact with the object to be worked has a composition containing iridium, containing rhenium, ruthenium, molybdenum, tungsten, niobium, tantalum, rhodium, or two or more of them, and containing zirconium, hafnium, lanthanum, cerium, samarium, gadolinium, scandium, yttrium, or two or more of them and has a Micro Vickers Hardness of 300 Hv or more.

In the friction stir welding tool according to the embodiment, an object to be worked for welding is a metal or an alloy having a high melting point of 1350° C. or more. As a matter of course, the friction stir welding tool can be used to weld a metal or an alloy having a melting point of lower than 1350° C. As several examples of the metal or the alloy having the high melting point of 1350° C. or more, a titanium, a titanium-based alloy, platinum, a platinum-based alloy, a stainless steel, and a steel having a carbon content of 2% by weight or less are given. In this case, the stainless steel is steel containing chromium of 12% or more, and includes all a martensitic stainless steel, a ferritic steel, and an austenite steel. Furthermore, the stainless steel includes a duplex stainless steel having a ferritic/austenite two-phase mixture composition and a PH stainless steel. In the friction stir welding tool 3 according to the embodiment, when friction stir welding is performed by using an object to be worked, for example, titanium, a titanium-based alloy, platinum, or a platinum-based alloy as a metal or an alloy having a high melting point of 1600° C. or more, the tool containing zirconium or/and hafnium selected from a group consisting of zirconium, hafnium, lanthanum, cerium, samarium, gadolinium, scandium, and yttrium is preferably used.

Objects to be worked which are confronted with each other may have different compositions. Furthermore, the metal and the alloy having the high melting point according to the embodiment includes an oxide-dispersion-strengthened metal or alloy in which oxide fine particles of a zirconium oxide, an aluminum oxide, an yttrium oxide, a hafnium oxide, or the like.

Portions to be brought into contact with an object to be worked are the columnar shoulder portion 5 and the pencil portion 4 formed on the end face of the shoulder portion 5 with reference to FIG. 1. At least the portion especially requires chemical stability, heat resistance, abrasion resistance, and thermal shock resistance. In FIG. 1, the shoulder portion 5 is formed to be long, and the motor 7 is attached to the shoulder portion 5. However, for example, a shaft portion (not shown) formed by another material may be fixed to the upper end portion of the shoulder portion 5, and the motor 7 may be attached to the shaft portion. Since the shaft portion is not directly rubbed, the required characteristics are not required highly more than those of the portion brought into contact with the object to be worked. Since the shaft portion serves as a shaft, the shaft portion requires torsional strength. Although the shaft portion is not a portion brought into contact with the object to be worked, the shaft portion may be formed by the same material as that of the shoulder portion 5 and the pencil portion 4.

The portion brought into contact with the object to be worked is formed by a material having a composition containing iridium, containing rhenium, ruthenium, molybdenum, tungsten, niobium, tantalum, rhodium, or two or more of them, and containing zirconium, hafnium, lanthanum, cerium, samarium, gadolinium, scandium, yttrium, or two or more of them. When objects to be worked having a high melting point of 1350° C. or more are friction-stir-welded, the friction stir welding tool is rotated while being pressed on the bonding regions of the objects to be worked. For this reason, compression stress and torsional stress act while the friction stir welding tool is heated to a temperature close to a melting point of the objects to be worked.

When the friction stir welding tool is formed by the material having the composition, material strength and material hardness are improved by adding rhenium, ruthenium, molybdenum, tungsten, niobium, or tantalum. Addition of rhodium improves chemical stability to oxidation attrition in a high-temperature usable atmosphere. Addition of zirconium, hafnium, lanthanum, cerium, samarium, gadolinium, scandium, or yttrium improves material strength and material hardness and achieves refinement of crystal grains. These operations reduces abrasion of the tool by friction between the tool and the objects to be worked to reduce mixing of an impurity in the objects to be worked.

The friction stir welding tool is formed by these materials to obtain high-temperature strength. Even though compression stress and torsional stress act during the operation, the friction stir welding tool can withstand the compression stress and the torsional stress. Since the friction stir welding tool has preferable thermal shock resistance, even though an increase/decrease in temperature is repeated each time the operation is performed, the friction stir welding tool is scarcely broken by the increase/decrease in temperature.

Furthermore, since a portion brought into contact with the objects to be worked requires abrasion resistance, the portion must be formed by a material having the composition and Micro Vickers Hardness of 300 Hv or more. The Micro Vickers Hardness is preferably 390 Hv or more, and more preferably 490 Hv or more. The hardness of the friction stir welding tool according to the embodiment was evaluated by a Micro Vickers Hardness test (JIS-Z2244). When the tool is formed by the material having a Micro Vickers Hardness of less than 300 Hv, the tool is easily worn by friction between the object to be worked and the tool. For this reason, the tool has a short life time.

A measurement of the Micro Vickers Hardness is measured by the Micro Vickers Hardness test (JIS-Z2244) after the heat treatment at 1350° C.

In the friction stir welding tool according to the embodiment, at least the portion brought into contact with the objects to be worked is formed by a ternary alloy, a quaternary alloy, a quinary or more alloy. However, for example, types of the ternary alloy will be described below. The types are expressed by using atomic symbols.

As the types of the ternary alloys, for example, an Ir—Re—Zr-base, an Ir—Ru—Zr-base, an Ir—Mo—Zr-base, an Ir—W—Zr-base, an Ir—Nb—Zr-base, an Ir—Ta—Zr-base, an Ir—Rh—Zr-base, an Ir—Re—Hf-base, an Ir—Ru—Hf-base, an Ir—Mo—Hf-base, Ir—W—Hf-base, an Ir—Nb—Hf-base, an Ir—Ta—Hf-base, an Ir—Rh—Hf-base, an Ir—Re—La-base, an Ir—Ru—La-base, an Ir—Mo—La-base, an Ir—W—La-base, an Ir—Nb—La-base, an Ir—Ta—La-base, an Ir—Rh—La-base, an Ir—Re—Ce-base, Ir—Ru—Ce-base, an Ir—Mo—Ce-base, an Ir—W—Ce-base, an Ir—Nb—Ce-base, an Ir—Ta—Ce-base, an Ir—Rh—Ce-base, an Ir—Re—Sm-base, an Ir—Ru—Sm-base, an Ir—Mo—Sm-base, an Ir—W—Sm-base, an Ir—Nb—Sm-base, an Ir—Ta—Sm-base, an Ir—Rh—Sm-base, an Ir—Re—Gd-base, an Ir—Ru—Gd-base, an Ir—Mo—Gd-base, an Ir—W—Gd-base, an Ir—Nb—Gd-base, an Ir—Ta—Gd-base, an Ir—Rh—Gd-base, an Ir—Re—Sc-base, an Ir—Ru—Sc-base, an Ir—Mo—Sc-base, an Ir—W—Sc-base, an Ir—Nb—Sc-base, an Ir—Ta—Sc-base, an Ir—Rh—Sc-base, an Ir—Re—Y-base, an Ir—Ru—Y-base, an Ir—Mo—Y-base, an Ir—W—Y-base, an Ir—Nb—Y-base, an Ir—Ta—Y-base, and an Ir—Rh—Y-base are known.

In this case, when the portion brought into contact with the objects to be worked is formed by a ternary alloy containing iridium, containing rhenium, and containing zirconium, hafnium, lanthanum, cerium, samarium, gadolinium, scandium, or yttrium, a content of rhenium is preferably set to 1.0 to 50.0 atomic percentages, and more preferably set to 10.0 to 25.0 atomic percentages. A content of zirconium, hafnium, lanthanum, cerium, samarium, gadolinium, scandium, or yttrium is preferably set to 0.1 to 5.0 atomic percentages, and more preferably set to 1.0 to 3.0 atomic percentages. When the content of rhenium is set to less than 1.0 atomic percentage, abrasion resistance may be insufficient. On the other hand, when the content exceeds 50.0 atomic percentages, an amount of oxidation volatilization attrition at a high temperature increases. When the content of zirconium, hafnium, lanthanum, cerium, samarium, gadolinium, scandium, or yttrium is set to less than 0.1 atomic percentage, abrasion resistance may be insufficient. On the other hand, when the content exceeds 5.0 atomic percentages, the melting point may decreases, or uniformity of the material may be deteriorated.

When the portion brought into contact with the objects to be worked is formed by a ternary alloy containing iridium, containing ruthenium, and containing zirconium, hafnium, lanthanum, cerium, samarium, gadolinium, scandium, or yttrium, a content of ruthenium is preferably set to 1.0 to 50.0 atomic percentages, and more preferably 10.0 to 25.0 atomic percentages. A content of zirconium, hafnium, lanthanum, cerium, samarium, gadolinium, scandium, or yttrium is preferably 0.1 to 5.0 atomic percentages, and more preferably set to 1.0 to 3.0 atomic percentages. When the content of ruthenium is less than 1.0 atomic percentages, abrasion resistance may be insufficient. On the other hand, when the content exceeds 50.0 atomic percentages, an amount of oxidation volatilization attrition at a high temperature increases. When the content of zirconium, hafnium, lanthanum, cerium, samarium, gadolinium, scandium, or yttrium is set to less than 0.1 atomic percentage, abrasion resistance may be insufficient. On the other hand, when the content exceeds 5.0 atomic percentages, the melting point may decrease, or uniformity of the material may be deteriorated.

When the portion brought into contact with the objects to be worked is formed by a ternary alloy containing iridium, containing molybdenum, and containing zirconium, hafnium, lanthanum, cerium, samarium, gadolinium, scandium, or yttrium, a content of molybdenum is preferably set to 1.0 to 35.0 atomic percentages, and more preferably set to 5.0 to 20.0 atomic percentages. A content of zirconium, hafnium, lanthanum, cerium, samarium, gadolinium, scandium, or yttrium is preferably 0.1 to 5.0 atomic percentages, and more preferably set to 1.0 to 3.0 atomic percentages. When the content of molybdenum is less than 1.0 atomic percentages, abrasion resistance may be insufficient. On the other hand, when the content exceeds 35.0 atomic percentages, an amount of oxidation volatilization attrition at a high temperature increases. When the content of zirconium, hafnium, lanthanum, cerium, samarium, gadolinium, scandium, or yttrium is set to less than 0.1 atomic percentage, abrasion resistance may be insufficient. On the other hand, when the content exceeds 5.0 atomic percentages, the melting point may decrease, or uniformity of the material may be deteriorated.

When the portion brought into contact with the objects to be worked is formed by a ternary alloy containing iridium, containing tungsten, and containing zirconium, hafnium, lanthanum, cerium, samarium, gadolinium, scandium, or yttrium, a content of tungsten is preferably set to 1.0 to 35.0 atomic percentages, and more preferably set to 5.0 to 20.0 atomic percentages. A content of zirconium, hafnium, lanthanum, cerium, samarium, gadolinium, scandium, or yttrium is preferably 0.1 to 5.0 atomic percentages, and more preferably set to 1.0 to 3.0 atomic percentages. When the content of tungsten is less than 1.0 atomic percentages, abrasion resistance may be insufficient. On the other hand, when the content exceeds 35.0 atomic percentages, an amount of oxidation volatilization attrition at a high temperature increases. When the content of zirconium, hafnium, lanthanum, cerium, samarium, gadolinium, scandium, or yttrium is set to less than 0.1 atomic percentage, abrasion resistance may be insufficient. On the other hand, when the content exceeds 5.0 atomic percentages, the melting point may decrease, or uniformity of the material may be deteriorated.

When the portion brought into contact with the objects to be worked is formed by a ternary alloy containing iridium, containing tantalum, and containing zirconium, hafnium, lanthanum, cerium, samarium, gadolinium, scandium, or yttrium, a content of tantalum is preferably set to 1.0 to 25.0 atomic percentages, and more preferably set to 5.0 to 15.0 atomic percentages. A content of zirconium, hafnium, lanthanum, cerium, samarium, gadolinium, scandium, or yttrium is preferably 0.1 to 5.0 atomic percentages, and more preferably set to 1.0 to 3.0 atomic percentages. When the content of tantalum is less than 1.0 atomic percentages, abrasion resistance may be insufficient. On the other hand, when the content exceeds 25.0 atomic percentages, an amount of oxidation volatilization attrition at a high temperature increases. When the content of zirconium, hafnium, lanthanum, cerium, samarium, gadolinium, scandium, or yttrium is set to less than 0.1 atomic percentage, abrasion resistance may be insufficient. On the other hand, when the content exceeds 5.0 atomic percentages, the melting point may decrease, or uniformity of the material may be deteriorated.

When the portion brought into contact with the objects to be worked is formed by a ternary alloy containing iridium, containing niobium, and containing zirconium, hafnium, lanthanum, cerium, samarium, gadolinium, scandium, or yttrium, a content of niobium is preferably set to 1.0 to 25.0 atomic percentages, and more preferably set to 5.0 to 15.0 atomic percentages. A content of zirconium, hafnium, lanthanum, cerium, samarium, gadolinium, scandium, or yttrium is preferably 0.1 to 5.0 atomic percentages, and more preferably set to 1.0 to 3.0 atomic percentages. When the content of niobium is less than 1.0 atomic percentages, abrasion resistance may be insufficient. On the other hand, when the content exceeds 25.0 atomic percentages, an amount of oxidation volatilization attrition at a high temperature increases. When the content of zirconium, hafnium, lanthanum, cerium, samarium, gadolinium, scandium, or yttrium is set to less than 0.1 atomic percentage, abrasion resistance may be insufficient. On the other hand, when the content exceeds 5.0 atomic percentages, the melting point may decrease, or uniformity of the material may be deteriorated.

In the friction stir welding tool according to the embodiment, the portion brought into contact with the object to be worked may be formed by not only a three-component-based alloy containing two components as sub-components, but also an alloy containing four or more components including three or more components as sub-components. For example, an iridium-rhenium-rhodium-zirconium alloy, an iridium-rhenium-rhodium-hafnium alloy, an iridium-rhenium-rhodium-yttrium alloy, an iridium-rhenium-rhodium-scandium alloy, an iridium-molybdenum-rhodium-zirconium alloy, an iridium-molybdenum-rhodium-hafnium alloy, an iridium-molybdenum-rhodium-yttrium alloy, an iridium-molybdenum-rhodium-scandium alloy, and the like are known. The portion is preferably formed by not only the above quaternary alloys but also the following quaternary alloys.

When the portion brought into contact with the objects to be worked is formed by a quaternary alloy containing iridium, containing rhenium and rhodium, and containing zirconium, hafnium, lanthanum, cerium, samarium, gadolinium, scandium, or yttrium, a content of rhenium is preferably set to 1.0 to 50.0 atomic percentages, and more preferably set to 10.0 to 25.0 atomic percentages. A content of rhodium is preferably set to 1.0 to 18.0 atomic percentages, and more preferably set to 5.0 to 15.0 atomic percentages. A content of zirconium, hafnium, lanthanum, cerium, samarium, gadolinium, scandium, or yttrium is preferably 0.1 to 5.0 atomic percentages, and more preferably set to 1.0 to 3.0 atomic percentages. When the content of rhenium is less than 1.0 atomic percentages, abrasion resistance may be insufficient. On the other hand, when the content exceeds 50.0 atomic percentages, an amount of oxidation volatilization attrition at a high temperature increases. When a content of rhodium is less than 1.0 atomic percentage, an effect of suppressing oxidation volatilization attrition at a high temperature is low. Even though the content exceeds 18.0 atomic percentages, a rate of improvement of the effect of suppressing oxidation volatilization attrition at a high temperature is small. When the content of zirconium, hafnium, lanthanum, cerium, samarium, gadolinium, scandium, or yttrium is set to less than 0.1 atomic percentage, abrasion resistance may be insufficient. On the other hand, when the content exceeds 5.0 atomic percentages, the melting point may decrease, or uniformity of the material may be deteriorated.

When the portion brought into contact with the objects to be worked is formed by a quaternary alloy containing iridium, containing ruthenium and rhodium, and containing zirconium, hafnium, lanthanum, cerium, samarium, gadolinium, scandium, or yttrium, a content of ruthenium is preferably set to 1.0 to 50.0 atomic percentages, and more preferably set to 10.0 to 25.0 atomic percentages. A content of rhodium is preferably set to 1.0 to 18.0 atomic percentages, and more preferably set to 5.0 to 15.0 atomic percentages. A content of zirconium, hafnium, lanthanum, cerium, samarium, gadolinium, scandium, or yttrium is preferably 0.1 to 5.0 atomic percentages, and more preferably set to 1.0 to 3.0 atomic percentages. When the content of ruthenium is less than 1.0 atomic percentages, abrasion resistance may be insufficient. On the other hand, when the content exceeds 50.0 atomic percentages, an amount of oxidation volatilization attrition at a high temperature increases. When a content of rhodium is less than 1.0 atomic percentage, an effect of suppressing oxidation volatilization attrition at a high temperature is low. Even though the content exceeds 18.0 atomic percentages, a rate of improvement of the effect of suppressing oxidation volatilization attrition at a high temperature is small. When the content of zirconium, hafnium, lanthanum, cerium, samarium, gadolinium, scandium, or yttrium is set to less than 0.1 atomic percentage, abrasion resistance may be insufficient. On the other hand, when the content exceeds 5.0 atomic percentages, the melting point may decrease, or uniformity of the material may be deteriorated.

When the portion brought into contact with the objects to be worked is formed by a quaternary alloy containing iridium, containing molybdenum and rhodium, and containing zirconium, hafnium, lanthanum, cerium, samarium, gadolinium, scandium, or yttrium, a content of molybdenum is preferably set to 1.0 to 35.0 atomic percentages, and more preferably set to 5.0 to 20.0 atomic percentages. A content of rhodium is preferably set to 1.0 to 18.0 atomic percentages, and more preferably set to 5.0 to 15.0 atomic percentages. A content of zirconium, hafnium, lanthanum, cerium, samarium, gadolinium, scandium, or yttrium is preferably 0.1 to 5.0 atomic percentages, and more preferably set to 1.0 to 3.0 atomic percentages. When the content of molybdenum is less than 1.0 atomic percentages, abrasion resistance may be insufficient. On the other hand, when the content exceeds 35.0 atomic percentages, an amount of oxidation volatilization attrition at a high temperature increases. When a content of rhodium is less than 1.0 atomic percentage, an effect of suppressing oxidation volatilization attrition at a high temperature is low. Even though the content exceeds 18.0 atomic percentages, a rate of improvement of the effect of suppressing oxidation volatilization attrition at a high temperature is small. When the content of zirconium, hafnium, lanthanum, cerium, samarium, gadolinium, scandium, or yttrium is set to less than 0.1 atomic percentage, abrasion resistance may be insufficient. On the other hand, when the content exceeds 5.0 atomic percentages, the melting point may decrease, or uniformity of the material may be deteriorated.

When the portion brought into contact with the objects to be worked is formed by a quaternary alloy containing iridium, containing tungsten and rhodium, and containing zirconium, hafnium, lanthanum, cerium, samarium, gadolinium, scandium, or yttrium, a content of tungsten is preferably set to 1.0 to 35.0 atomic percentages, and more preferably set to 5.0 to 20.0 atomic percentages. A content of rhodium is preferably set to 1.0 to 18.0 atomic percentages, and more preferably set to 5.0 to 15.0 atomic percentages. A content of zirconium, hafnium, lanthanum, cerium, samarium, gadolinium, scandium, or yttrium is preferably 0.1 to 5.0 atomic percentages, and more preferably set to 1.0 to 3.0 atomic percentages. When the content of tungsten is less than 1.0 atomic percentages, abrasion resistance may be insufficient. On the other hand, when the content exceeds 35.0 atomic percentages, an amount of oxidation volatilization attrition at a high temperature increases. When a content of rhodium is less than 1.0 atomic percentage, an effect of suppressing oxidation volatilization attrition at a high temperature is low. Even though the content exceeds 18.0 atomic percentages, a rate of improvement of the effect of suppressing oxidation volatilization attrition at a high temperature is small. When the content of zirconium, hafnium, lanthanum, cerium, samarium, gadolinium, scandium, or yttrium is set to less than 0.1 atomic percentage, abrasion resistance may be insufficient. On the other hand, when the content exceeds 5.0 atomic percentages, the melting point may decrease, or uniformity of the material may be deteriorated.

When the portion brought into contact with the objects to be worked is formed by a quaternary alloy containing iridium, containing tantalum and rhodium, and containing zirconium, hafnium, lanthanum, cerium, samarium, gadolinium, scandium, or yttrium, a content of tantalum is preferably set to 1.0 to 25.0 atomic percentages, and more preferably set to 5.0 to 15.0 atomic percentages. A content of rhodium is preferably set to 1.0 to 18.0 atomic percentages, and more preferably set to 5.0 to 15.0 atomic percentages. A content of zirconium, hafnium, lanthanum, cerium, samarium, gadolinium, scandium, or yttrium is preferably 0.1 to 5.0 atomic percentages, and more preferably set to 1.0 to 3.0 atomic percentages. When the content of tantalum is less than 1.0 atomic percentages, abrasion resistance may be insufficient. On the other hand, when the content exceeds 25.0 atomic percentages, an amount of oxidation volatilization attrition at a high temperature increases. When a content of rhodium is less than 1.0 atomic percentage, an effect of suppressing oxidation volatilization attrition at a high temperature is low. Even though the content exceeds 18.0 atomic percentages, a rate of improvement of the effect of suppressing oxidation volatilization attrition at a high temperature is small. When the content of zirconium, hafnium, lanthanum, cerium, samarium, gadolinium, scandium, or yttrium is set to less than 0.1 atomic percentage, abrasion resistance may be insufficient. On the other hand, when the content exceeds 5.0 atomic percentages, the melting point may decrease, or uniformity of the material may be deteriorated.

When the portion brought into contact with the objects to be worked is formed by a quaternary alloy containing iridium, containing niobium and rhodium, and containing zirconium, hafnium, lanthanum, cerium, samarium, gadolinium, scandium, or yttrium, a content of niobium is preferably set to 1.0 to 25.0 atomic percentages, and more preferably set to 5.0 to 15.0 atomic percentages. A content of rhodium is preferably set to 1.0 to 18.0 atomic percentages, and more preferably set to 5.0 to 15.0 atomic percentages. A content of zirconium, hafnium, lanthanum, cerium, samarium, gadolinium, scandium, or yttrium is preferably 0.1 to 5.0 atomic percentages, and more preferably set to 1.0 to 3.0 atomic percentages. When the content of niobium is less than 1.0 atomic percentages, abrasion resistance may be insufficient. On the other hand, when the content exceeds 25.0 atomic percentages, an amount of oxidation volatilization attrition at a high temperature increases. When a content of rhodium is less than 1.0 atomic percentage, an effect of suppressing oxidation volatilization attrition at a high temperature is low. Even though the content exceeds 18.0 atomic percentages, a rate of improvement of the effect of suppressing oxidation volatilization attrition at a high temperature is small. When the content of zirconium, hafnium, lanthanum, cerium, samarium, gadolinium, scandium, or yttrium is set to less than 0.1 atomic percentage, abrasion resistance may be insufficient. On the other hand, when the content exceeds 5.0 atomic percentages, the melting point may decrease, or uniformity of the material may be deteriorated.

In any cases, iridium is a necessary component. As a main component, 50 or more atomic percentages of iridium are preferably contained in the material. More preferably, the content of iridium is 70 atomic percentages or more. Depending on the contents of sub-components, the content of iridium may be less than 50 atomic percentages.

In the friction stir welding tool according to the embodiment, when either a ternary alloy or a quaternary or more alloy is used, in order to suppress volatilization at a high temperature, the portion brought into contact with the objects to be worked preferably contains at least iridium and rhodium, and a content of rhodium is preferably set to 1.0 to 18.0 atomic percentages. The lifetime of the tool can be elongated by suppressing not only mechanical abrasion but also high-temperature volatilization.

In the friction stir welding tool according to the embodiment, when the tool which achieves the composition is to be manufactured, the tool is preferably formed by a solid solution obtained by a dissolution method. Furthermore, the tool may be formed by a sintered body obtained by a sintering method.

In the friction stir welding tool according to the embodiment, a plurality of combinations of sub-components to iridium serving as a necessary component are exemplified. However, selection of the sub-components may be changed depending on objects to be worked.

In the friction stir welding tool according to the embodiment, the shape of the tool is not limited. The shape of the tool is arbitrarily selected depending on an object to be worked in consideration of a friction coefficient and stirring efficiency.

In the friction stir welding method according to the embodiment, objects to be worked formed by a metal or an alloy having a high melting point of 1350° C. or more are to be welded by using the friction stir welding tool according to the embodiment.

Welding is preferably performed while applying an iridium back plate, a back plate (reference numeral 6 in FIG. 1) containing iridium and containing rhenium, ruthenium, molybdenum, tungsten, niobium, tantalum, rhodium, zirconium, hafnium, or two or more of them as sub-components, or a back plate coated with an iridium film or a film having the composition to a rear surface side of a pressing surface of the friction stir welding tool. Since the rear surface side of the pressing surface of the friction stir welding tool is also heated to a high temperature, when a back plate of a stainless steel or the like is applied, the back plate and the object to be worked may be welded. When not only the friction stir welding tool but also the back plate contain iridium or have the composition containing iridium and containing rhenium or the like as a sub-component, the tool is not welded on to object to be worked, mixing of an impurity in a welded portion can be reduced. The iridium film or the film having the composition may be applied as a back plate. In this case, a base material coated with a film is preferably formed by the material having the composition. However, the embodiment includes the case in which the base material is not formed by the material having the composition. The thickness of the film is set to, for example, 10 to 500 μm, and preferably set to 50 to 100 μm. The composition of the friction stir welding tool and the composition of the back plate or the film coated thereon are preferably the same compositions. However, as long as the condition in which the iridium back plate is used, the condition in which the back plate having the composition containing iridium and containing rhenium, ruthenium, molybdenum, tungsten, niobium, tantalum, rhodium, zirconium, hafnium, or two or more of them as sub-components, or the condition in which the back plate is coated with a film having the component are satisfied, different combinations may be combined to each other.

When the friction stir welding method according to the embodiment is performed, even though objects to be worked having a high melting point, a workpiece having a friction stir welding portion in which a small amount of impurity is mixed can be obtained.

EXAMPLES

Figure 2:
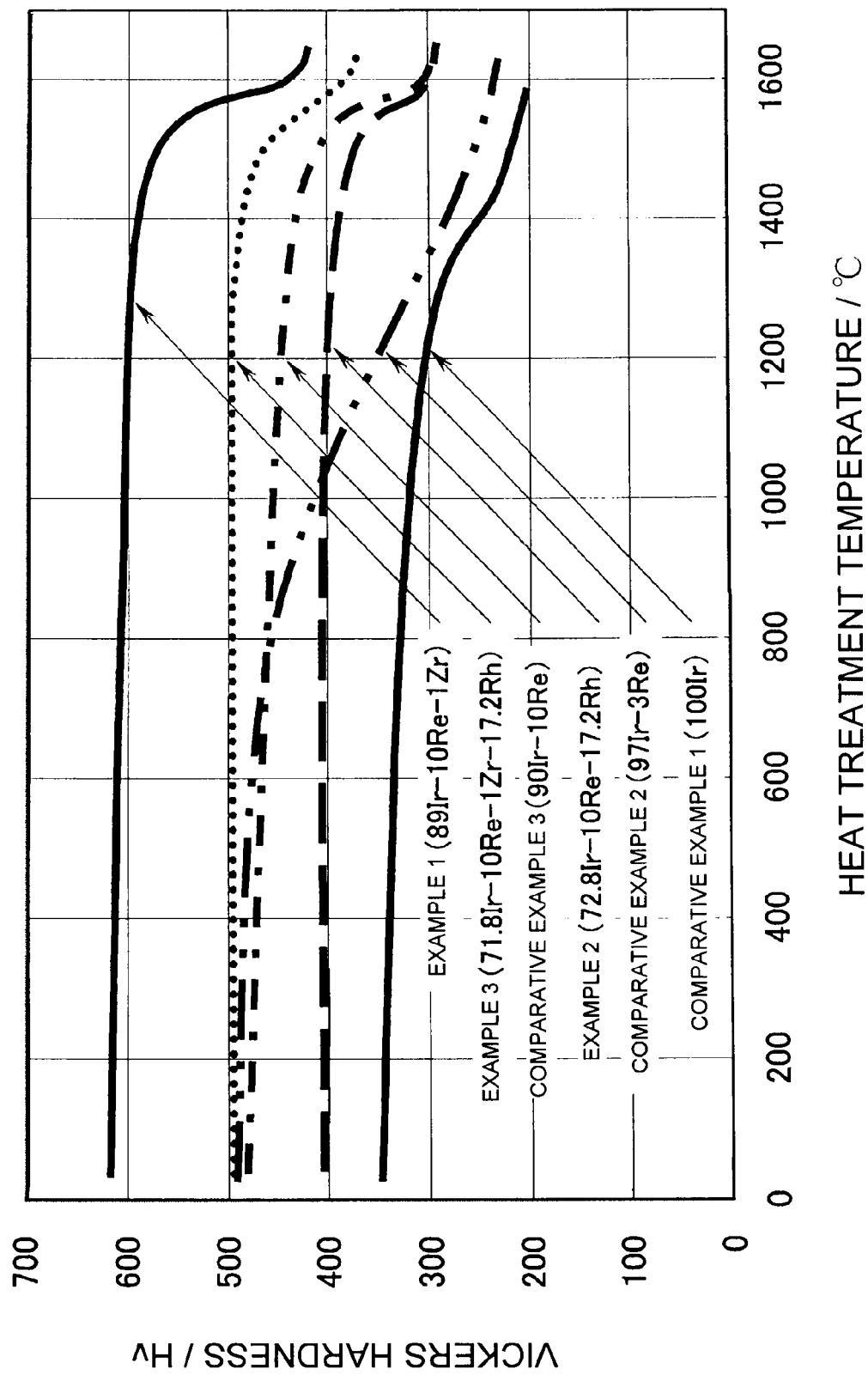
FIG. 2 is a graph showing a relationship between a heat treatment temperature and a Micro Vickers Hardness.
Figure 3:
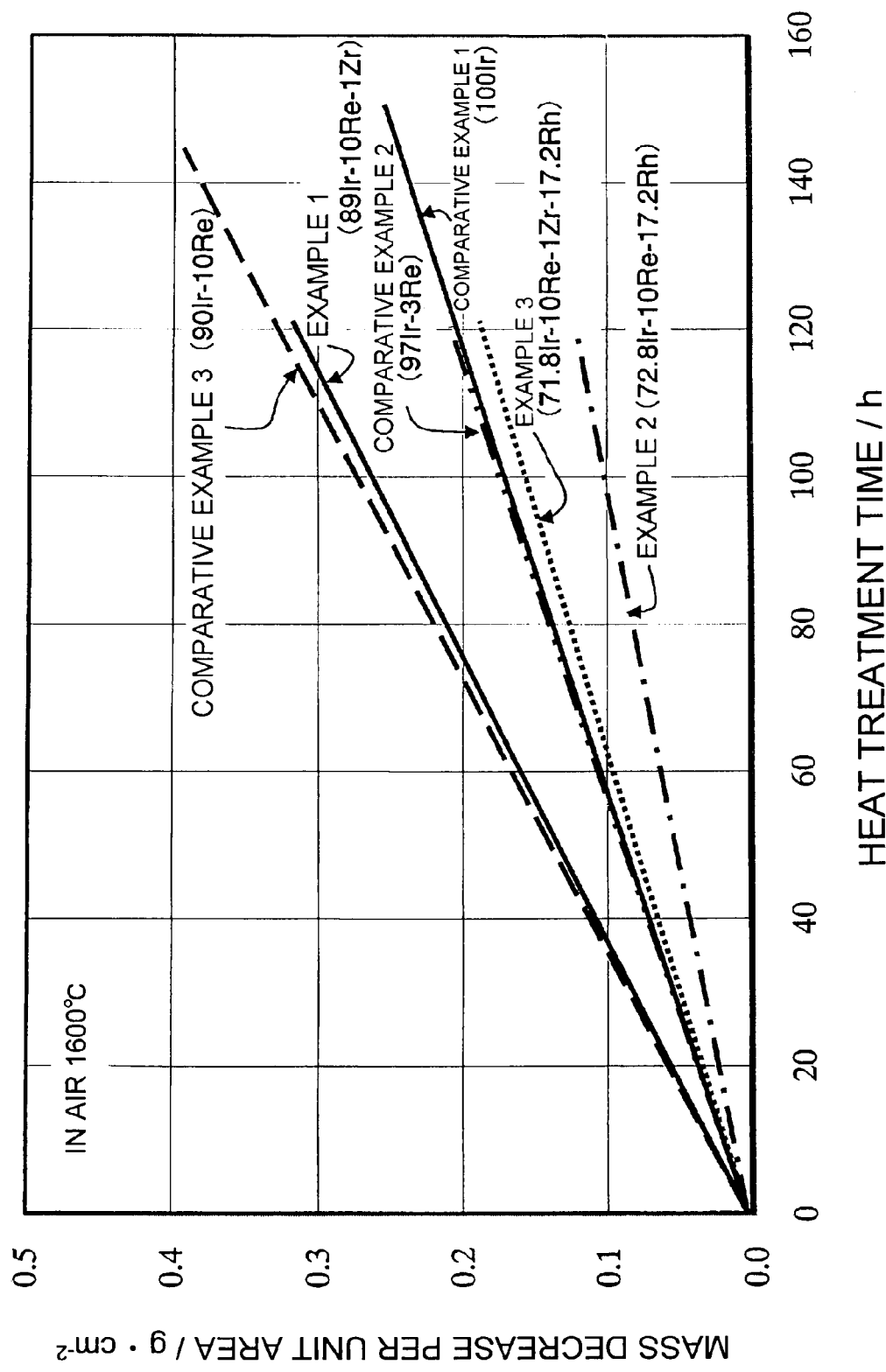
FIG. 3 is a graph showing a relationship between a heat treating time and a mass decrease per unit area.

Alloys having compositions shown in Table 1 were formed as Example 1 to Example 4 and Comparative Examples 1 to 3, on the basis of a Micro Vickers Hardness test (JIS-Z2244) (HV-112, Akashi, Japan), Micro Vickers Hardnesses based on heat treatment temperatures in Examples 1 to 3 and Comparative Examples 1 to 3 were measured. The measurement results are shown in FIG. 2 (recrystallization temperature examination). FIG. 2 is a graph showing a relationship between a heat treatment temperature and a Micro Vickers Hardness. A mass decrease in high-temperature volatilization at 1600° C. in the atmosphere was measured. Masses of a sample before and after heat treatment were measured, and a difference between the masses was calculated and set as a mass decrease. At this time, a surface area of the sample was calculated, the mass decrease is divided by the surface area, and a mass decrease per unit area was calculated. Measurement results are shown in FIG. 3 (high-temperature volatilization test). FIG. 3 is a graph showing a relationship between a heat treatment time and a mass decrease per unit area.

TABLE 1

| | Composition (atomic %) |
|---|---|
| Example 1 | 89.0 Ir—10.0 Re—1.0 Zr |
| Example 2 | 72.8 Ir—10.0 Re—17.2 Rh |
| Example 3 | 71.8 Ir—10.0 Re—1.0 Zr—17.2 Rh |
| Example 4 | 89.0 Ir—10.0 Re—1.0 Hf |
| Comparative Example 1 | 100 Ir |
| Comparative Example 2 | 97.0 Ir—3.0 Re |
| Comparative Example 3 | 90.0 Ir—10.0 Re |

In terms of hardness and abrasion resistance, a Vickers Hardness of 300 Hv or more was required. From FIG. 2, in Examples 1 to 3, even though samples subjected to heat treatment at 1350° C. or more were measured at a room temperature, a Vickers Hardness of 300 Hv or more could be maintained. However, in Comparative Examples 1 and 2, when samples subjected to heat treatment at about 1300° C. were measured at the room temperature, the Vickers Hardnesses were lower than 300 Hv. In order to obtain the hardnesses, it was confirmed that other elements such as zirconium, rhodium, and hafnium and appropriate contents were necessary.

From FIG. 3, in Examples 2 and 3, mass decreases of the alloys containing rhodium in heat treatment time were smaller than those in Comparative Examples 1 to 3. An effect of maintaining a hardness of 300 Hv or more to volatilization attrition by containing rhodium was confirmed.

Figure 4:
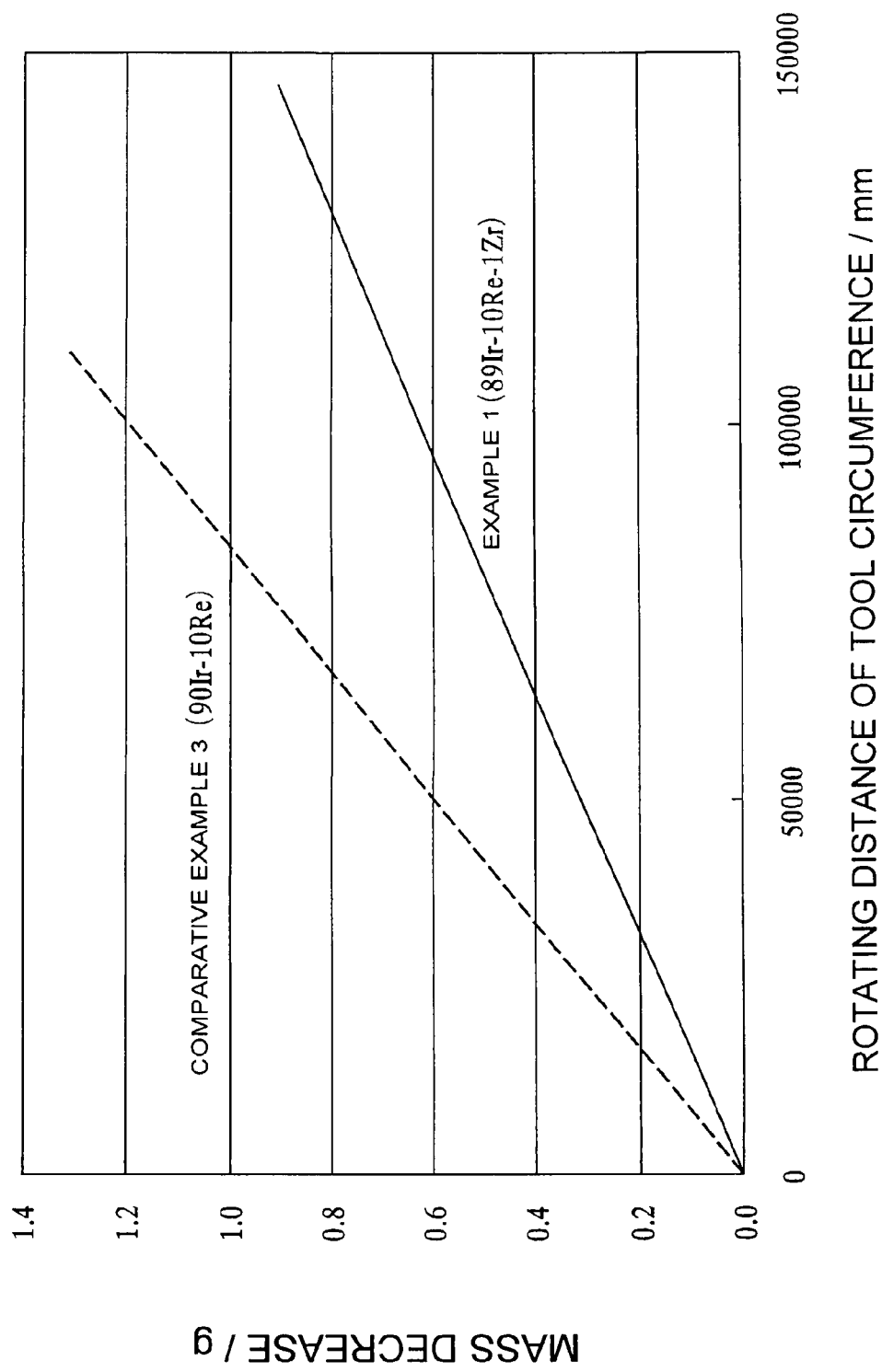
FIG. 4 is a graph showing a relationship between a rotating distance of the circumference of the tool and a mass decrease per unit area.

Amounts of wear in Example 1 and Comparative Example 3 were measured. As objects to be worked, plates of oxide-dispersion-strengthened platinum alloy (containing 82.13 atomic percentages of platinum, 0.23 atomic percentages of zirconium oxide, and 17.64 atomic percentages of rhodium, having a thickness of 1.5 mm, and available from Furuya Metal Co., Ltd.) were applied to each other to form a boundary area, and the friction stir welding tools of Example 1 and Comparative Example 3 were pressed on the boundary area to attempt welding by a friction stir welding method. The melting point of the zirconium-oxide-dispersion-strengthened platinum alloy is about 1860° C. Measurement results are shown in FIG. 4 (examination of amount of wear). FIG. 4 is a graph showing a relationship between a rotating distance of the circumference of the tool and a mass decrease per unit area. The rotating distance of the tool circumference was calculated by circumference of the shoulder portion 5×rotating speed×welding time(welding distance/feed speed). At this time, a mass decrease of the tool circumference was calculated by mass before welding−mass after welding. From FIG. 4, in Example 1 formed by a ternary alloy, a mass decrease in a rotating distance was smaller than that in Comparative Example 3 formed by a binary alloy. An effect of maintaining resistance to abrasion by forming a sample by a ternary or more alloy was confirmed.

Friction stir welding tests using the friction stir welding tools formed with the compositions in Example 1 and Comparative Example 1 were attempted. More specifically, plates of a stainless steel (SUS-304) were applied to each other as objects to be worked to form a boundary region, and the friction stir welding tools formed with the compositions in Example 1 and Comparative Example 1 were pressed on the boundary region to attempt welding by a friction stir welding method. The melting point of the SUS-304 is about 1400 to 1450° C. The welding could be performed by using the friction stir welding tools formed with the compositions in Example 1 and Comparative Example 1. In any example using the friction stir welding tools formed with the compositions in Example 1 and Comparative Example 1, cracks of the friction stir welding tools were not found.

Friction stir welding tests using the friction stir welding tools formed with the compositions in Example 1 and Comparative Example 3 were attempted. As objects to be worked, plates of oxide-dispersion-strengthened platinum alloy (containing 82.13 atomic percentages of platinum, 0.23 atomic percentages of zirconium oxide, and 17.64 atomic percentages of rhodium, having a thickness of 1.5 mm, and available from Furuya Metal Co., Ltd.) were applied to each other to form a boundary area, and the friction stir welding tools of Example 1 and Comparative Example 3 were pressed on the boundary area to attempt welding by a friction stir welding method. The melting point of the zirconium-oxide-dispersion-strengthened platinum alloy is about 1860° C. The welding could be performed by using the friction stir welding tools formed with the compositions in Example 1 and Comparative Example 3. In any example using the friction stir welding tools formed with the compositions in Example 1 and Comparative Example 3, cracks of the friction stir welding tools were not found.

A welding distance of SUS-304 was set to 100 cm, welding was performed once, and amounts of wear of the friction stir welding tools were evaluated. A rotating speed and a feed rate were set to be constant. As the amounts of wear, differences of the masses of the friction stir welding tools before and after the welding were measured. The amount of wear of the friction stir welding tool of Example 1 was 0.3 (g), and the amount of wear of the friction stir welding tool in Comparative Example 1 was about 1.5 (g). Therefore, the friction stir welding tool of Example 1 could friction-stir-weld high-melting-point objects to be worked, and abrasion of the tool was small. On the other hand, the friction stir welding tool of Comparative Example 1 could friction-stir-weld high-melting-point objects to be worked. However, an amount of wear of the tool was large, and the tool could be rapidly deteriorated.

A welding distance of oxide-dispersion-strengthened platinum alloy (containing 82.13 atomic percentages of platinum, 0.23 atomic percentages of zirconium oxide, and 17.64 atomic percentages of rhodium, having a thickness of 1.5 mm, and available from Furuya Metal Co., Ltd.) was set to 100 cm, welding was performed once, and an amount of wear of a friction stir welding tool was evaluated. A rotating speed and a feed rate were set to be constant. As the amounts of wear, differences of the masses of the friction stir welding tools before and after the welding were measured. The amount of wear of the friction stir welding tool of Example 1 was 0.60 (g), and the amount of wear of the friction stir welding tool in Comparative Example 3 was about 1.14 (g). Therefore, the friction stir welding tool of Example 1 could friction-stir-weld high-melting-point objects to be worked, and abrasion of the tool was small. On the other hand, the friction stir welding tool of Comparative Example 3 could friction-stir-weld high-melting-point objects to be worked. However, an amount of wear of the tool was large, and the tool could be rapidly deteriorated.

Objects to be worked were friction-stir-welded by the friction stir welding tool having the component of Example 1 on a back plate having a composition of 89.0 Ir-10.0 Re-1.0 Zr (numerical values are atomic percentages) of Example 1. At this time, the back plate was not welded on the objected to be worked. In a plate thickness direction of the welded portion, the pressing surface of the friction stir welding tool and the rear surface of the back plate side were EPMA-analyzed by using an electron micro-analyzer (available from JEOL Ltd,). As a result, it was not recognized that iridium, rhenium, and zirconium were mixed into the welded portion as impurities. Furthermore, it was found that welding and mixing of impurities in the welded portion could be prevented when a friction stir welding tool having the composition of Example 2 and a back plate having the component of Example 2 were used, when a friction stir welding tool having a component of Example 3 and a back plate having the composition of Example 3 were used, and when a friction stir welding tool having a composition of Example 4 and a back plate having the composition of Example 4 were used.

On the other hand, welding was performed by using the friction stir welding tool having the composition of Example 1 and a back plate of SUS-304. At this time, welding of the back plates occurred on the object to be worked. Similarly, EPMA analysis was performed. As a result, it was recognized that iron was diffused in the welded portion as impurities to weld the back plate. An iron content on the rear surface of the object to be worked on the back plate side was 3% at most, and an iron content on the surface of the object to be worked on the pressing side of the friction stir welding tool was 300 ppm at most. Therefore, it was considered that SUS-304 was stirred and mixed to the surface side (pressing surface side) of the object to be worked in the step of frictional stirring.

Figure 5:
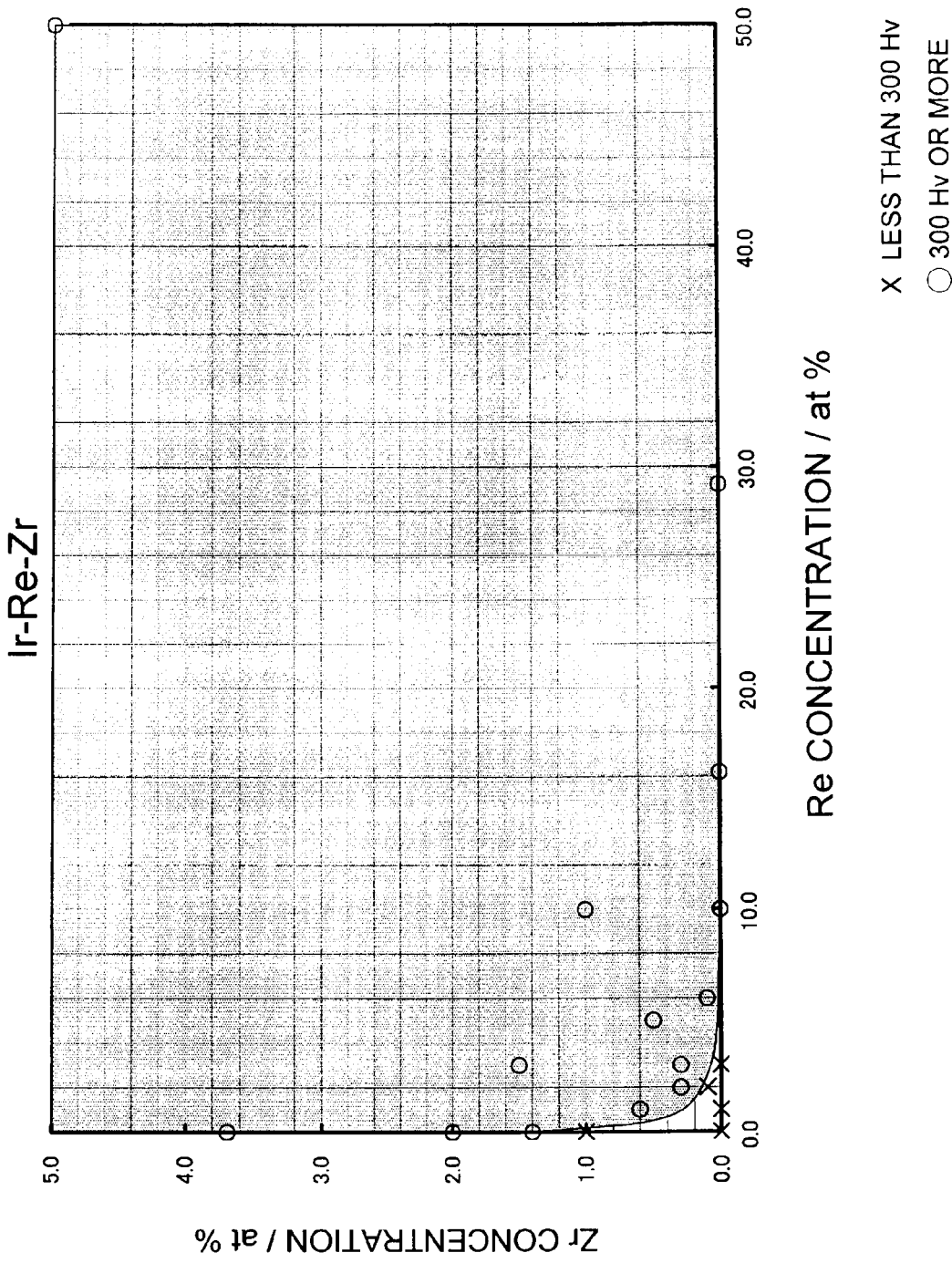
FIG. 5 is a graph showing a range of a composition of an Ir—Re—Zr-based alloy having a Micro Vickers Hardness of 300 Hv or more.

A relationship between a composition and a hardness of an Ir—Re—Zr-based alloy was examined. Alloys having compositions shown in Table 2 were formed as samples, and, on the basis of a Micro Vickers Hardness test (JIS-Z2244) (HV-112, Akashi, Japan), Micro Vickers Hardnesses of the samples were measured after the alloys were solved and solidified. Measurement results are shown in Table 2. FIG. 5 shows a range (hatched region) of a composition having a Micro Vickers Hardness of 300 Hv or more. In FIG. 5, descriptions of a composition range having more than 50 atomic percentages of Re and a composition range having more than 5 atomic percentages of Zr are omitted. A relationship between a composition and a hardness of a binary iridium alloy was also examined.

TABLE 2

| Sample Number | Ir (atomic %) | Re (atomic %) | Zr (atomic %) | Micro Vickers Hardness (Hv) |
|---|---|---|---|---|
| 1 | 100.0 | 0.0 | 0.0 | 189.8 |
| 2 | 99.0 | 1.0 | 0.0 | 212.9 |
| 3 | 99.0 | 0.0 | 1.0 | 265.3 |
| 4 | 97.9 | 2.0 | 0.1 | 278.5 |
| 5 | 97.0 | 3.0 | 0.0 | 259.1 |
| 6 | 98.6 | 0.0 | 1.4 | 300.0 |
| 7 | 98.4 | 1.0 | 0.6 | 387.3 |
| 8 | 98.0 | 0.0 | 2.0 | 365.2 |
| 9 | 97.7 | 2.0 | 0.3 | 314.7 |
| 10 | 96.7 | 3.0 | 0.3 | 360.0 |
| 11 | 96.3 | 0.0 | 3.7 | 709.1 |
| 12 | 95.5 | 3.0 | 1.5 | 494.3 |
| 13 | 94.5 | 5.0 | 0.5 | 365.8 |
| 14 | 93.9 | 6.0 | 0.1 | 417.2 |
| 15 | 90.0 | 10.0 | 0.0 | 300.0 |
| 16 | 89.0 | 10.0 | 1.0 | 495.5 |
| 17 | 83.8 | 16.2 | 0.0 | 371.7 |
| 18 | 70.8 | 29.2 | 0.0 | 644.2 |
| 19 | 45.0 | 50.0 | 5.0 | 611.5 |

Referring to FIG. 5, improvement rates of Micro Vickers Hardnesses of Re and Zr to amounts of additive are different from each other. In order to obtain a Micro Vickers Hardness of 300 Hv or more, when the content of Zr is set to the lower limit, i.e., 0.1 atomic percentage, it is understood that 2.5 or more atomic percentages of Re may be contained in the sample. When the content of Re is set to the lower limit, i.e., 1.0 atomic percentage, it is understood that 0.3 or more atomic percentages of Zr may be contained in the sample. In a composition range having more than 50 atomic percentages of Re and a composition range having more than 5 atomic percentages of Zr, a volatilization loss may increase during frictional stirring, or the melting point may decrease.

Figure 6:
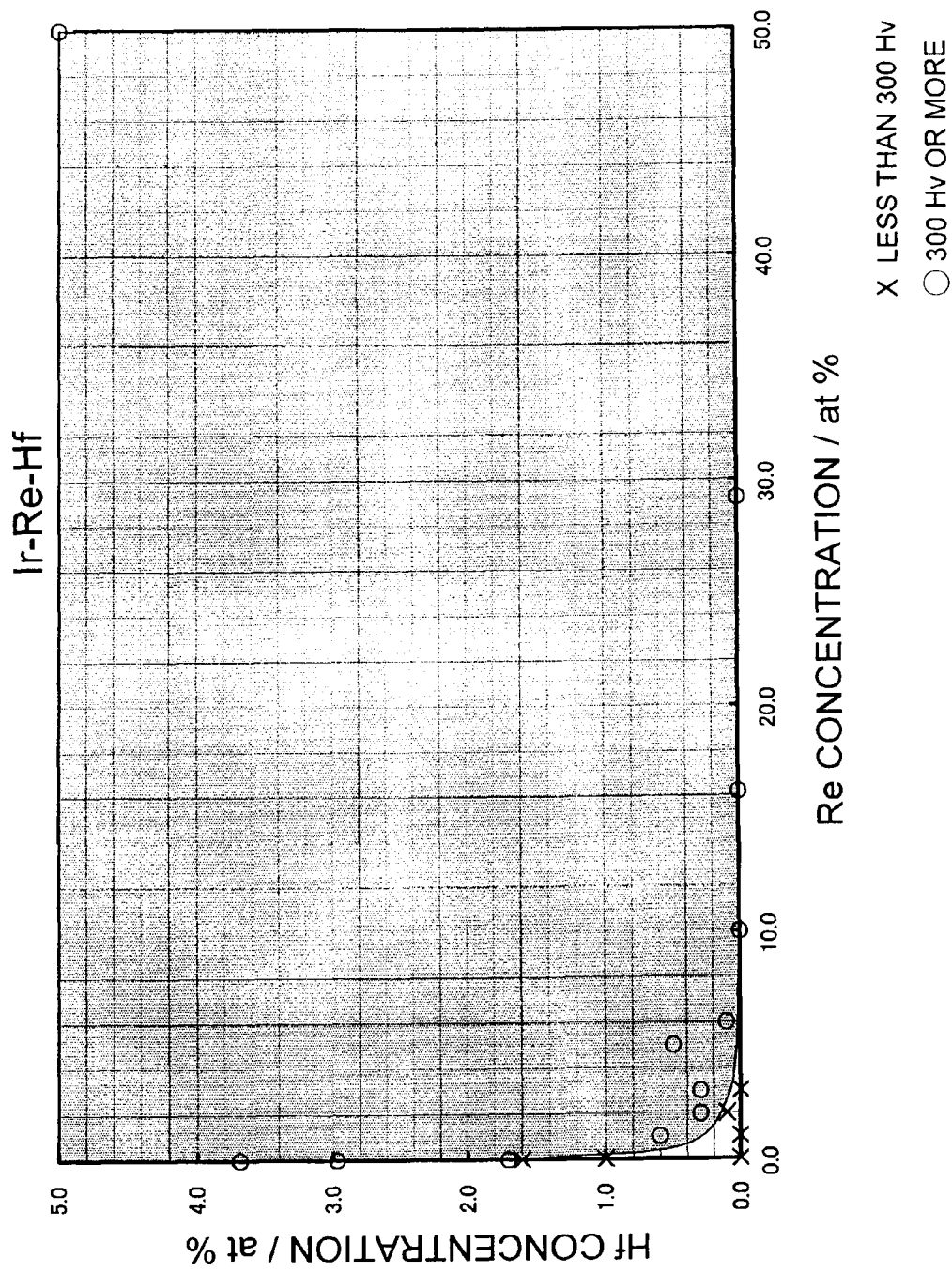
FIG. 6 is a graph showing a range of a composition of an Ir—Re—Hf-based alloy having a Micro Vickers Hardness of 300 Hv or more.

A relationship between a composition and a hardness of an Ir—Re—Hf-based alloy was examined. Alloys having compositions shown in Table 3 were formed as samples, and, as in the case of the Ir—Re—Zr-based alloy, Micro Vickers Hardnesses of the samples were measured after the alloys were solved and solidified. Measurement results are shown in Table 3. FIG. 6 shows a range (hatched region) of a composition having a Micro Vickers Hardness of 300 Hv or more. In FIG. 6, descriptions of a composition range having more than 50 atomic percentages of Re and a composition range having more than 5 atomic percentages of Hf are omitted. A relationship between a composition and a hardness of a binary iridium alloy was also examined.

TABLE 3

| Sample Number | Ir (atomic %) | Re (atomic %) | Hf (atomic %) | Micro Vickers Hardness (Hv) |
|---|---|---|---|---|
| 20 | 100.0 | 0.0 | 0.0 | 189.8 |
| 21 | 99.0 | 1.0 | 0.0 | 212.9 |
| 22 | 99.0 | 0.0 | 1.0 | 257.0 |
| 23 | 98.4 | 0.0 | 1.6 | 289.0 |
| 24 | 97.9 | 2.0 | 0.1 | 276.2 |
| 25 | 97.0 | 3.0 | 0.0 | 259.1 |

TABLE 3-continued

| Sample Number | Ir (atomic %) | Re (atomic %) | Hf (atomic %) | Micro Vickers Hardness (Hv) |
|---|---|---|---|---|
| 26 | 98.4 | 1.0 | 0.6 | 406.1 |
| 27 | 98.3 | 0.0 | 1.7 | 300.0 |
| 28 | 97.7 | 2.0 | 0.3 | 311.3 |
| 29 | 97.0 | 0.0 | 3.0 | 429.1 |
| 30 | 96.7 | 3.0 | 0.3 | 400.7 |
| 31 | 96.3 | 0.0 | 3.7 | 709.1 |
| 32 | 94.5 | 5.0 | 0.5 | 385.2 |
| 33 | 93.9 | 6.0 | 0.1 | 407.6 |
| 34 | 90.0 | 10.0 | 0.0 | 300.0 |
| 35 | 83.8 | 16.2 | 0.0 | 371.7 |
| 36 | 70.8 | 29.2 | 0.0 | 644.2 |
| 37 | 45.0 | 50.0 | 5.0 | 597.0 |

Referring to FIG. 6, improvement rates of Micro Vickers Hardnesses of Re and Hf to amounts of additive are different from each other. In order to obtain a Micro Vickers Hardness of 300 Hv or more, when the content of Hf is set to the lower limit, i.e., 0.1 atomic percentage, it is understood that 2.5 or more atomic percentages of Re may be contained in the sample. When the content of Re is set to the lower limit, i.e., 1.0 atomic percentage, it is understood that 0.3 or more atomic percentages of Hf may be contained in the sample. In a composition range having more than 50 atomic percentages of Re and a composition range having more than 5 atomic percentages of Hf, a volatilization loss may increase during frictional stirring, or the melting point may decrease.

Figure 7:
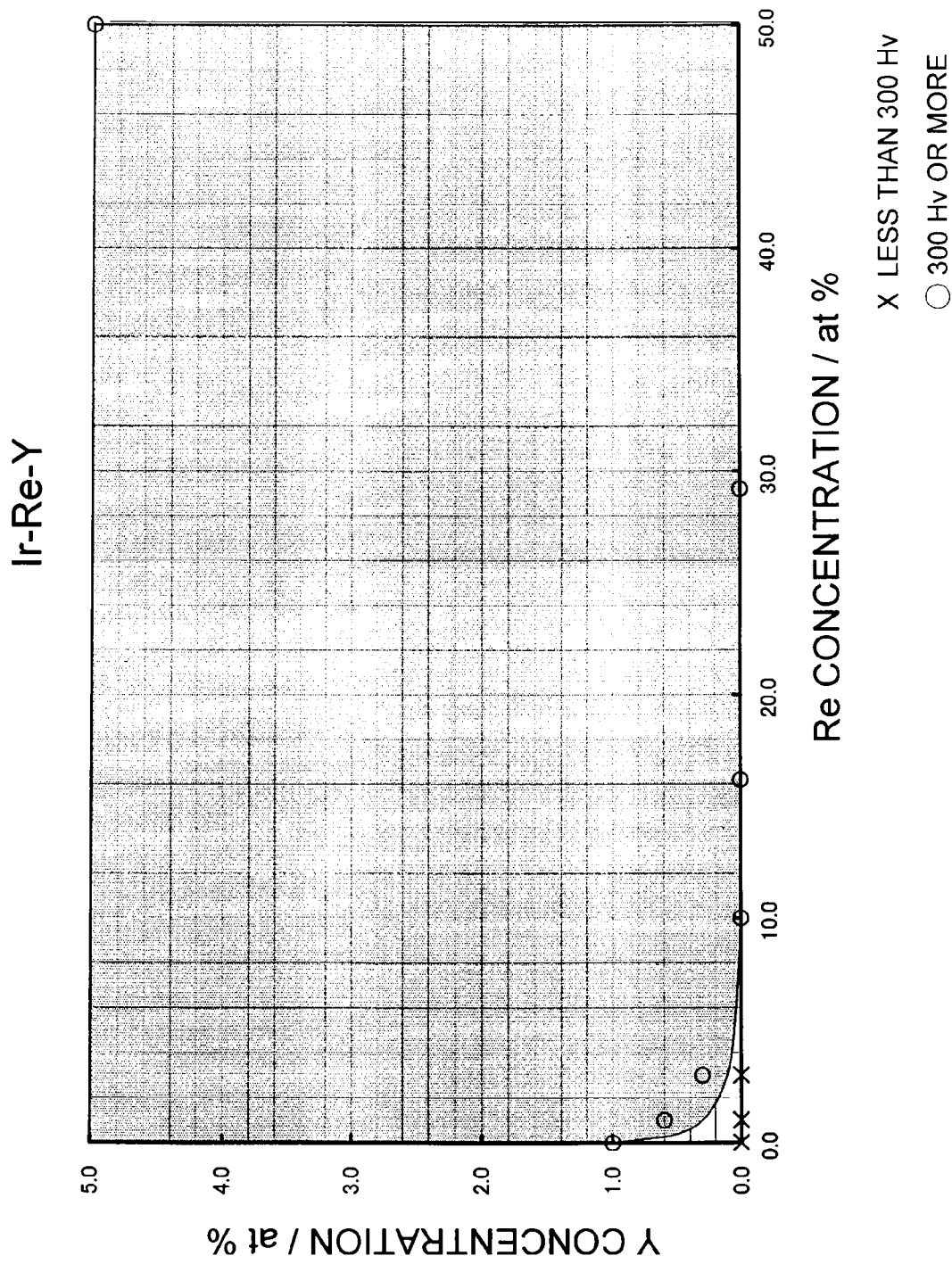
FIG. 7 is a graph showing a range of a composition of an Ir—Re—Y-based alloy having a Micro Vickers Hardness of 300 Hv or more.

A relationship between a composition and a hardness of an Ir—Re—Y-based alloy was examined. Alloys having compositions shown in Table 4 were formed as samples, and, as in the case of the Ir—Re—Zr-based alloy, Micro Vickers Hardnesses of the samples were measured after the alloys were solved and solidified. Measurement results are shown in Table 4. FIG. 7 shows a range (hatched region) of a composition having a Micro Vickers Hardness of 300 Hv or more. In FIG. 7, descriptions of a composition range having more than 50 atomic percentages of Re and a composition range having more than 5 atomic percentages of Y are omitted. A relationship between a composition and a hardness of a binary iridium alloy was also examined.

TABLE 4

| Sample Number | Ir (atomic %) | Re (atomic %) | Y (atomic %) | Micro Vickers Hardness (Hv) |
|---|---|---|---|---|
| 38 | 100.0 | 0.0 | 0.0 | 189.8 |
| 39 | 99.0 | 1.0 | 0.0 | 212.9 |
| 40 | 97.0 | 3.0 | 0.0 | 259.1 |
| 41 | 99.0 | 0.0 | 1.0 | 325.8 |
| 42 | 98.4 | 1.0 | 0.6 | 391.1 |
| 43 | 96.7 | 3.0 | 0.3 | 380.0 |
| 44 | 90.0 | 10.0 | 0.0 | 300.0 |
| 45 | 83.8 | 16.2 | 0.0 | 371.7 |
| 46 | 70.8 | 29.2 | 0.0 | 644.2 |
| 47 | 45.0 | 50.0 | 5.0 | 653.5 |

Referring to FIG. 7, improvement rates of Micro Vickers Hardnesses of Re and Y to amounts of additive are different from each other. In order to obtain a Micro Vickers Hardness of 300 Hv or more, when the content of Y is set to the lower limit, i.e., 0.1 atomic percentage, it is understood that 3.0 or more atomic percentages of Re may be contained in the sample. When the content of Re is set to the lower limit, i.e., 1.0 atomic percentage, it is understood that 0.3 or more atomic percentages of Y may be contained in the sample. In a composition range having more than 50 atomic percentages of Re and a composition range having more than 5 atomic percentages of Y, a volatilization loss may increase during frictional stirring, or the melting point may decrease.

Figure 8:
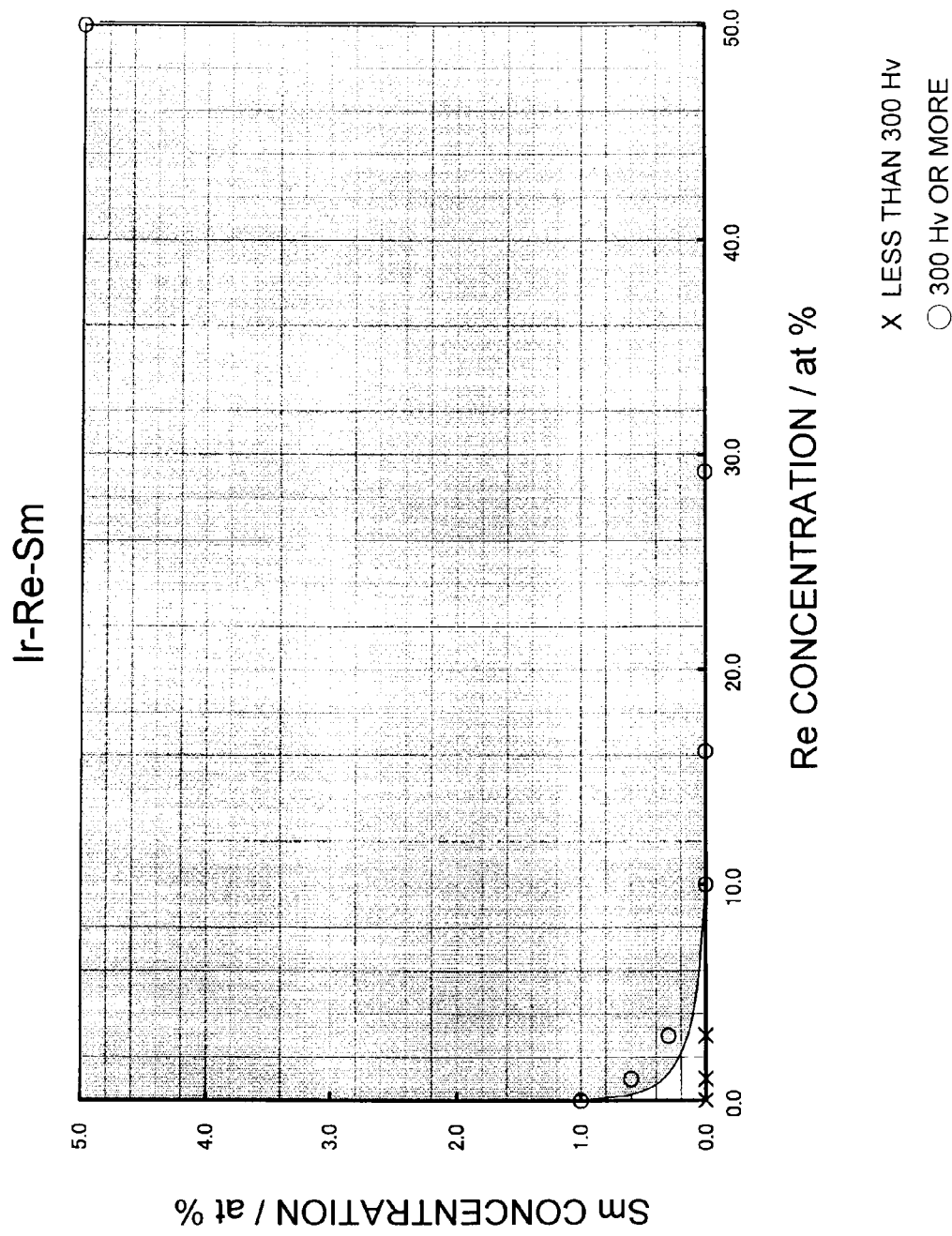
FIG. 8 is a graph showing a range of a composition of an Ir—Re—Sm-based alloy having a Micro Vickers Hardness of 300 Hv or more.

A relationship between a composition and a hardness of an Ir—Re—Sm-based alloy was examined. Alloys having compositions shown in Table 5 were formed as samples, and, as in the case of the Ir—Re—Zr-based alloy, Micro Vickers Hardnesses of the samples were measured after the alloys were solved and solidified. Measurement results are shown in Table 5. FIG. 8 shows a range (hatched region) of a composition having a Micro Vickers Hardness of 300 Hv or more. In FIG. 8, descriptions of a composition range having more than 50 atomic percentages of Re and a composition range having more than 5 atomic percentages of Sm are omitted. A relationship between a composition and a hardness of a binary iridium alloy was also examined.

TABLE 5

| Sample Number | Ir (atomic %) | Re (atomic %) | Sm (atomic %) | Micro Vickers Hardness (Hv) |
|---|---|---|---|---|
| 48 | 100.0 | 0.0 | 0.0 | 189.8 |
| 49 | 99.0 | 1.0 | 0.0 | 212.9 |
| 50 | 97.0 | 3.0 | 0.0 | 259.1 |
| 51 | 99.0 | 0.0 | 1.0 | 300.0 |
| 52 | 98.4 | 1.0 | 0.6 | 368.1 |
| 53 | 96.7 | 3.0 | 0.3 | 340.0 |
| 54 | 90.0 | 10.0 | 0.0 | 300.0 |
| 55 | 83.8 | 16.2 | 0.0 | 371.7 |
| 56 | 70.8 | 29.2 | 0.0 | 644.2 |
| 57 | 45.0 | 50.0 | 5.0 | 449.0 |

Referring to FIG. 8, improvement rates of Micro Vickers Hardnesses of Re and Sm to amounts of additive are different from each other. In order to obtain a Micro Vickers Hardness of 300 Hv or more, when the content of Sm is set to the lower limit, i.e., 0.1 atomic percentage, it is understood that 4.0 or more atomic percentages of Re may be contained in the sample. When the content of Re is set to the lower limit, i.e., 1.0 atomic percentage, it is understood that 0.3 or more atomic percentages of Sm may be contained in the sample. In a composition range having more than 50 atomic percentages of Re and a composition range having more than 5 atomic percentages of Sm, a volatilization loss may increase during frictional stirring, or the melting point may decrease.

Figure 9:
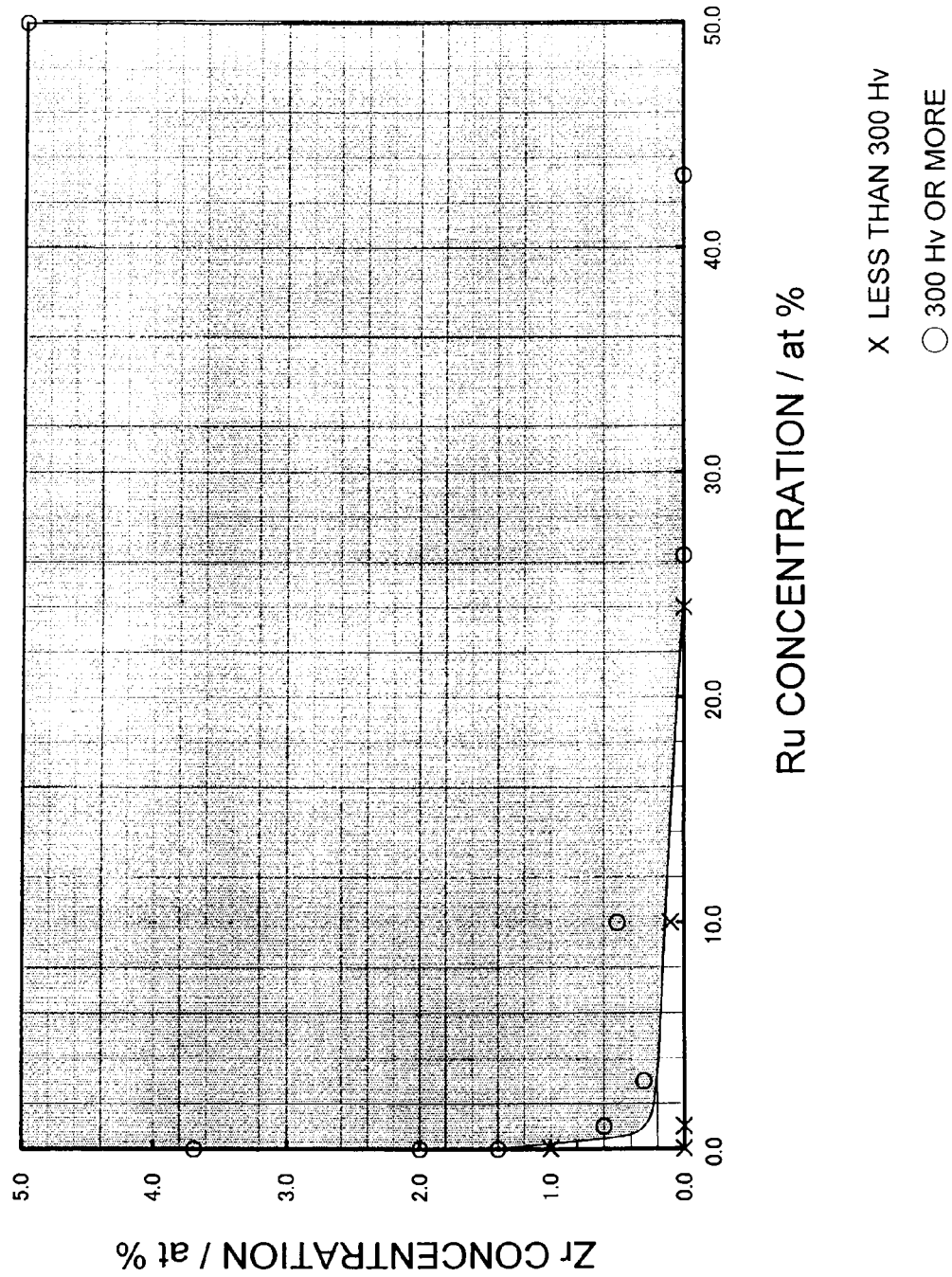
FIG. 9 is a graph showing a range of a composition of an Ir—Ru—Zr-based alloy having a Micro Vickers Hardness of 300 Hv or more.

A relationship between a composition and a hardness of an Ir—Ru—Zr-based alloy was examined. Alloys having compositions shown in Table 6 were formed as samples, and, as in the case of the Ir—Re—Zr-based alloy, Micro Vickers Hardnesses of the samples were measured after the alloys were solved and solidified. Measurement results are shown in Table 6. FIG. 9 shows a range (hatched region) of a composition having a Micro Vickers Hardness of 300 Hv or more. In FIG. 9, descriptions of a composition range having more than 50 atomic percentages of Ru and a composition range having more than 5 atomic percentages of Zr are omitted. A relationship between a composition and a hardness of a binary iridium alloy was also examined.

TABLE 6

| Sample Number | Ir (atomic %) | Ru (atomic %) | Zr (atomic %) | Micro Vickers Hardness (Hv) |
|---|---|---|---|---|
| 58 | 100.0 | 0.0 | 0.0 | 189.8 |
| 59 | 99.0 | 1.0 | 0.0 | 215.9 |
| 60 | 99.0 | 0.0 | 1.0 | 265.3 |
| 61 | 89.9 | 10.0 | 0.1 | 286.9 |
| 62 | 76.0 | 24.0 | 0.0 | 282.1 |

TABLE 6-continued

| Sample Number | Ir (atomic %) | Ru (atomic %) | Zr (atomic %) | Micro Vickers Hardness (Hv) |
|---|---|---|---|---|
| 63 | 98.6 | 0.0 | 1.4 | 300.0 |
| 64 | 98.4 | 1.0 | 0.6 | 400.2 |
| 65 | 98.0 | 0.0 | 2.0 | 365.2 |
| 66 | 96.7 | 3.0 | 0.3 | 373.2 |
| 67 | 96.3 | 0.0 | 3.7 | 709.1 |
| 68 | 89.5 | 10.0 | 0.5 | 375.1 |
| 69 | 73.7 | 26.3 | 0.0 | 300.0 |
| 70 | 56.8 | 43.2 | 0.0 | 428.7 |
| 71 | 45.0 | 50.0 | 5.0 | 620.5 |

Referring to FIG. 9, improvement rates of Micro Vickers Hardnesses of Ru and Zr to amounts of additive are different from each other. In order to obtain a Micro Vickers Hardness of 300 Hv or more, when the content of Zr is set to the lower limit, i.e., 0.1 atomic percentage, it is understood that 14 or more atomic percentages of Ru may be contained in the sample. When the content of Ru is set to the lower limit, i.e., 1.0 atomic percentage, it is understood that 0.3 or more atomic percentages of Zr may be contained in the sample. In a composition range having more than 50 atomic percentages of Ru and a composition range having more than 5 atomic percentages of Zr, a volatilization loss may increase during frictional stirring, or the melting point may decrease.

Figure 10:
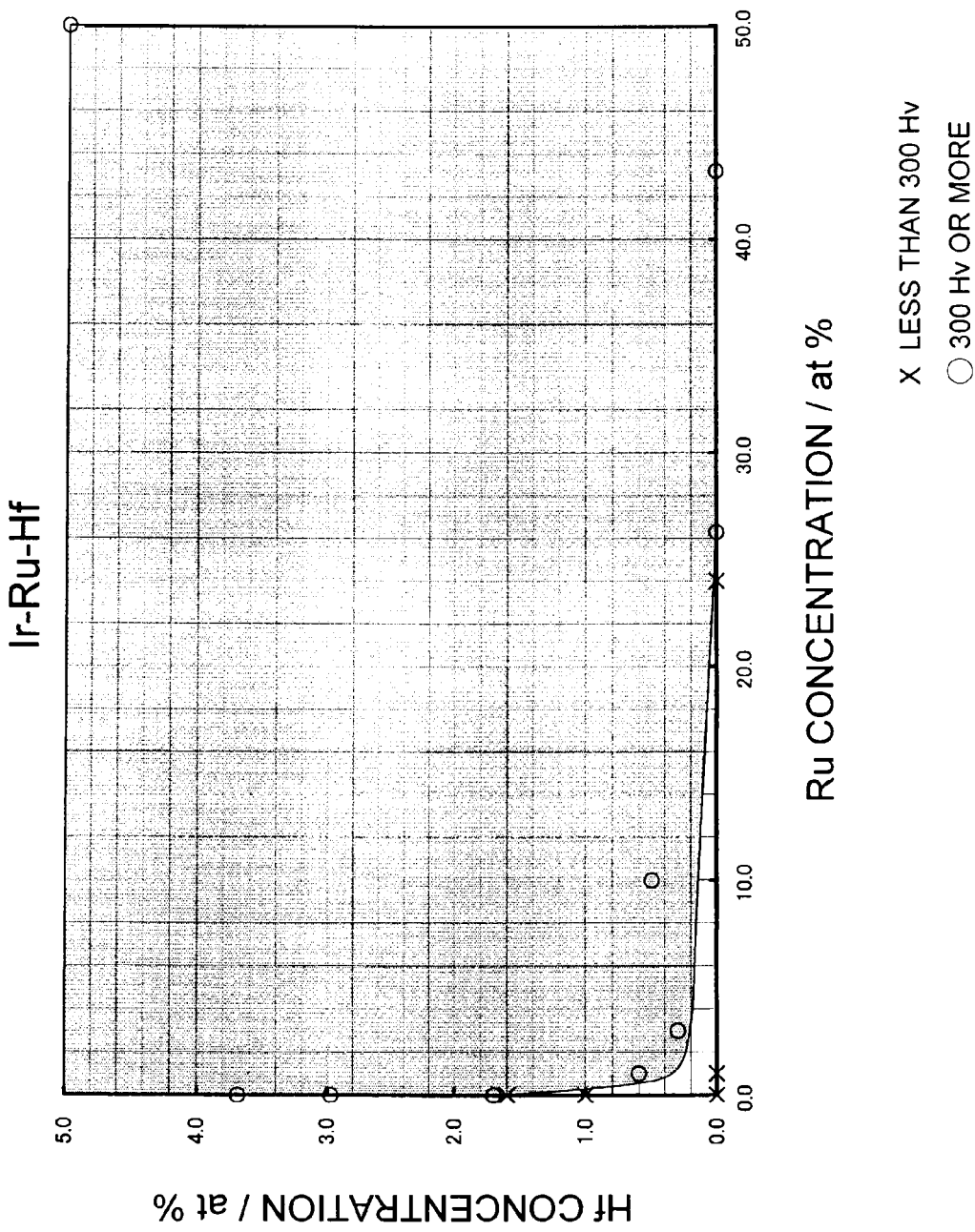
FIG. 10 is a graph showing a range of a composition of an Ir—Ru—Hf-based alloy having a Micro Vickers Hardness of 300 Hv or more.

A relationship between a composition and a hardness of an Ir—Ru—Hf-based alloy was examined. Alloys having compositions shown in Table 7 were formed as samples, and, as in the case of the Ir—Re—Zr-based alloy, Micro Vickers Hardnesses of the samples were measured after the alloys were solved and solidified. Measurement results are shown in Table 7. FIG. 10 shows a range (hatched region) of a composition having a Micro Vickers Hardness of 300 Hv or more. In FIG. 10, descriptions of a composition range having more than 50 atomic percentages of Ru and a composition range having more than 5 atomic percentages of Hf are omitted. A relationship between a composition and a hardness of a binary iridium alloy was also examined.

TABLE 7

| Sample Number | Ir (atomic %) | Ru (atomic %) | Hf (atomic %) | Micro Vickers Hardness (Hv) |
|---|---|---|---|---|
| 72 | 100.0 | 0.0 | 0.0 | 189.8 |
| 73 | 99.0 | 1.0 | 0.0 | 215.9 |
| 74 | 99.0 | 0.0 | 1.0 | 257.0 |
| 75 | 98.4 | 0.0 | 1.6 | 289.0 |
| 76 | 76.0 | 24.0 | 0.0 | 282.1 |
| 77 | 98.4 | 1.0 | 0.6 | 370.0 |
| 78 | 98.3 | 0.0 | 1.7 | 300.0 |
| 79 | 97.0 | 0.0 | 3.0 | 429.1 |
| 80 | 96.7 | 3.0 | 0.3 | 360.0 |
| 81 | 96.3 | 0.0 | 3.7 | 709.1 |
| 82 | 89.5 | 10.0 | 0.5 | 370.1 |
| 83 | 73.7 | 26.3 | 0.0 | 300.0 |
| 84 | 56.8 | 43.2 | 0.0 | 428.7 |
| 85 | 45.0 | 50.0 | 5.0 | 707.6 |

Referring to FIG. 10, improvement rates of Micro Vickers Hardnesses of Ru and Hf to amounts of additive are different from each other. In order to obtain a Micro Vickers Hardness of 300 Hv or more, when the content of Hf is set to the lower limit, i.e., 0.1 atomic percentage, it is understood that 14 or more atomic percentages of Ru may be contained in the sample. When the content of Ru is set to the lower limit, i.e., 1.0 atomic percentage, it is understood that 0.3 or more atomic percentages of Hf may be contained in the sample. In a composition range having more than 50 atomic percentages of Ru and a composition range having more than 5 atomic percentages of Hf, a volatilization loss may increase during frictional stirring, or the melting point may decrease.

Figure 11:
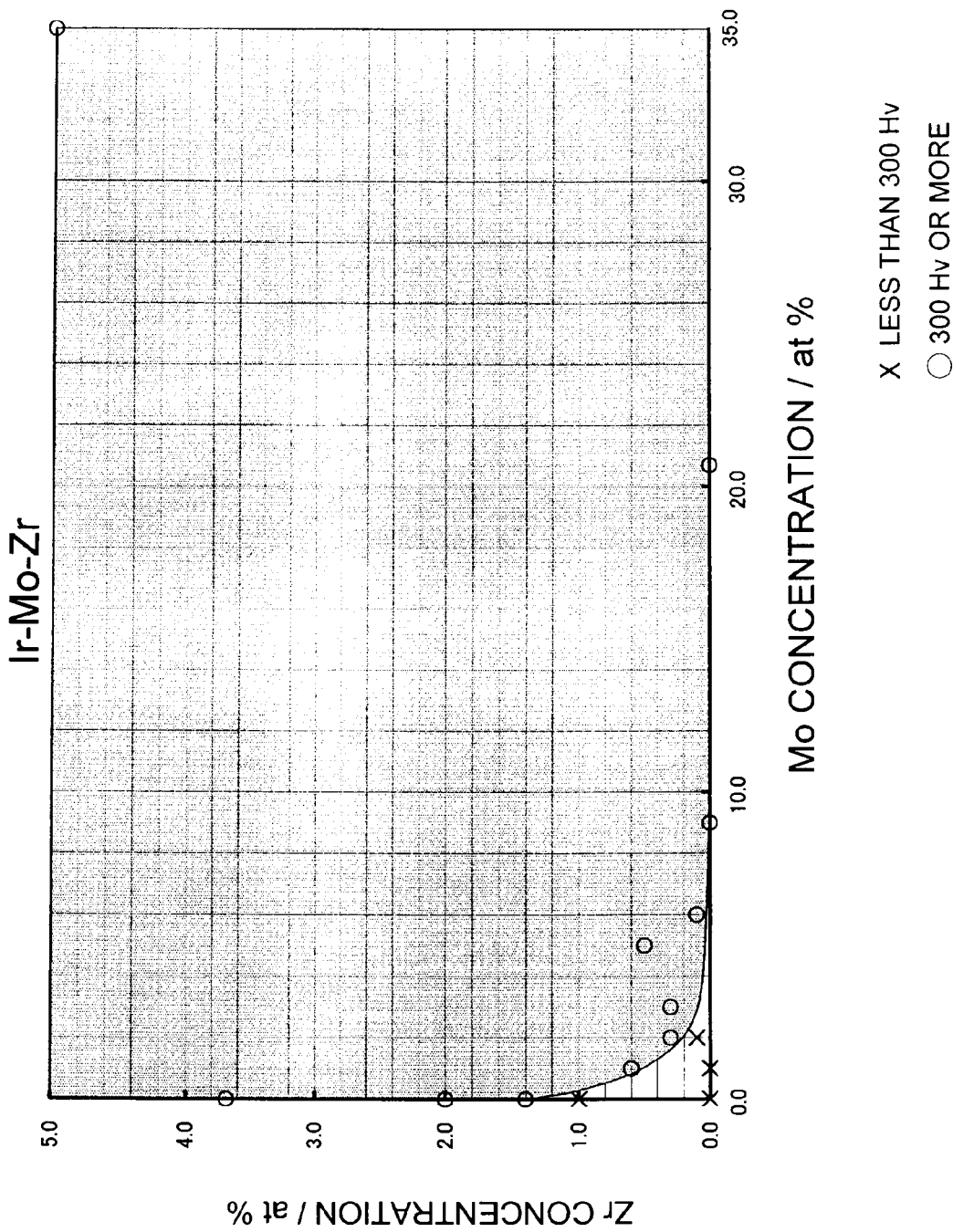
FIG. 11 is a graph showing a range of a composition of an Ir—Mo—Zr-based alloy having a Micro Vickers Hardness of 300 Hv or more.

A relationship between a composition and a hardness of an Ir—Mo—Zr-based alloy was examined. Alloys having compositions shown in Table 8 were formed as samples, and, as in the case of the Ir—Re—Zr-based alloy, Micro Vickers Hardnesses of the samples were measured after the alloys were solved and solidified. Measurement results are shown in Table 8. FIG. 11 shows a range (hatched region) of a composition having a Micro Vickers Hardness of 300 Hv or more. In FIG. 11, descriptions of a composition range having more than 35 atomic percentages of Mo and a composition range having more than 5 atomic percentages of Zr are omitted. A relationship between a composition and a hardness of a binary iridium alloy was also examined.

TABLE 8

| Sample Number | Ir (atomic %) | Mo (atomic %) | Zr (atomic %) | Micro Vickers Hardness (Hv) |
|---|---|---|---|---|
| 86 | 100.0 | 0.0 | 0.0 | 189.8 |
| 87 | 99.0 | 1.0 | 0.0 | 222.9 |
| 88 | 99.0 | 0.0 | 1.0 | 265.3 |
| 89 | 97.9 | 2.0 | 0.1 | 285.3 |
| 90 | 98.6 | 0.0 | 1.4 | 300.0 |
| 91 | 98.4 | 1.0 | 0.6 | 319.1 |
| 92 | 98.0 | 0.0 | 2.0 | 365.2 |
| 93 | 97.7 | 2.0 | 0.3 | 315.2 |
| 94 | 96.7 | 3.0 | 0.3 | 322.2 |
| 95 | 96.3 | 0.0 | 3.7 | 709.1 |
| 96 | 94.5 | 5.0 | 0.5 | 393.1 |
| 97 | 93.9 | 6.0 | 0.1 | 349.4 |
| 98 | 91.0 | 9.0 | 0.0 | 300.0 |
| 99 | 79.3 | 20.7 | 0.0 | 654.8 |
| 100 | 60.0 | 35.0 | 5.0 | 804.3 |

Referring to FIG. 11, improvement rates of Micro Vickers Hardnesses of Mo and Zr to amounts of additive are different from each other. In order to obtain a Micro Vickers Hardness of 300 Hv or more, when the content of Zr is set to the lower limit, i.e., 0.1 atomic percentage, it is understood that 3.0 or more atomic percentages of Mo may be contained in the sample. When the content of Mo is set to the lower limit, i.e., 1.0 atomic percentage, it is understood that 0.5 or more atomic percentages of Zr may be contained in the sample. In a composition range having more than 35 atomic percentages of Mo and a composition range having more than 5 atomic percentages of Zr, a volatilization loss may increase during frictional stirring, or the melting point may decrease.

Figure 12:
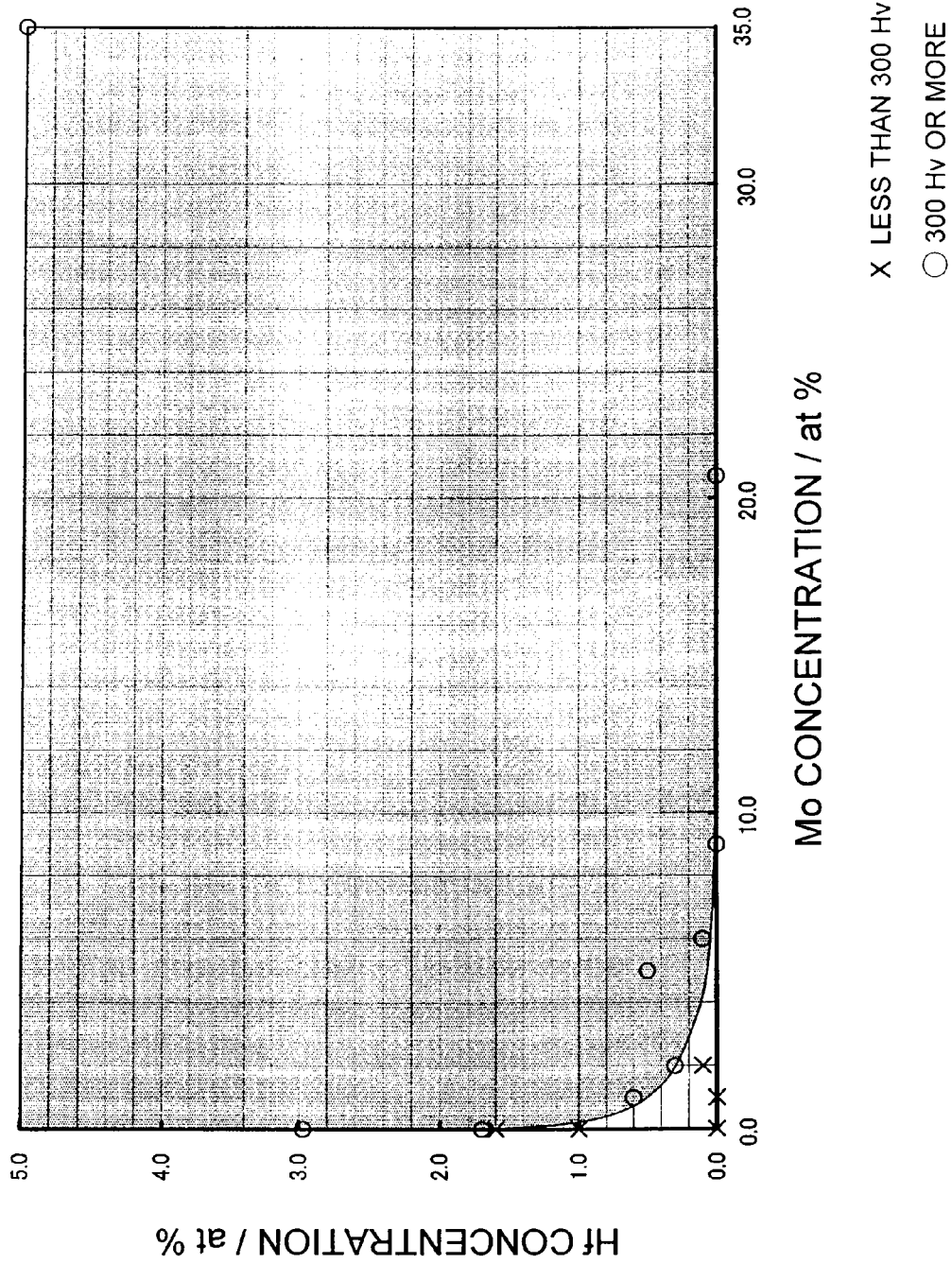
FIG. 12 is a graph showing a range of a composition of an Ir—Mo—Hf-based alloy having a Micro Vickers Hardness of 300 Hv or more.

A relationship between a composition and a hardness of an Ir—Mo—Hf-based alloy was examined. Alloys having compositions shown in Table 9 were formed as samples, and, as in the case of the Ir—Re—Zr-based alloy, Micro Vickers Hardnesses of the samples were measured after the alloys were solved and solidified. Measurement results are shown in Table 9. FIG. 12 shows a range (hatched region) of a composition having a Micro Vickers Hardness of 300 Hv or more. In FIG. 12, descriptions of a composition range having more than 35 atomic percentages of Mo and a composition range having more than 5 atomic percentages of Hf are omitted. A relationship between a composition and a hardness of a binary iridium alloy was also examined.

TABLE 9

| Sample Number | Ir (atomic %) | Mo (atomic %) | Hf (atomic %) | Micro Vickers Hardness (Hv) |
|---|---|---|---|---|
| 101 | 100.0 | 0.0 | 0.0 | 189.8 |
| 102 | 99.0 | 1.0 | 0.0 | 222.9 |
| 103 | 99.0 | 0.0 | 1.0 | 257.0 |
| 104 | 98.4 | 0.0 | 1.6 | 289.0 |
| 105 | 97.9 | 2.0 | 0.1 | 275.0 |
| 106 | 98.4 | 1.0 | 0.6 | 315.0 |
| 107 | 98.3 | 0.0 | 1.7 | 300.0 |
| 108 | 97.7 | 2.0 | 0.3 | 301.0 |
| 109 | 97.0 | 0.0 | 3.0 | 429.2 |
| 110 | 94.5 | 5.0 | 0.5 | 370.1 |
| 111 | 93.9 | 6.0 | 0.1 | 320.0 |
| 112 | 91.0 | 9.0 | 0.0 | 300.0 |
| 113 | 79.3 | 20.7 | 0.0 | 654.8 |
| 114 | 60.0 | 35.0 | 5.0 | 836.0 |

Referring to FIG. 12, improvement rates of Micro Vickers Hardnesses of Mo and Hf to amounts of additive are different from each other. In order to obtain a Micro Vickers Hardness of 300 Hv or more, when the content of Hf is set to the lower limit, i.e., 0.1 atomic percentage, it is understood that 4.0 or more atomic percentages of Mo may be contained in the sample. When the content of Mo is set to the lower limit, i.e., 1.0 atomic percentage, it is understood that 0.5 or more atomic percentages of Hf may be contained in the sample. In a composition range having more than 35 atomic percentages of Mo and a composition range having more than 5 atomic percentages of Hf, a volatilization loss may increase during frictional stirring, or the melting point may decrease.

Figure 13:
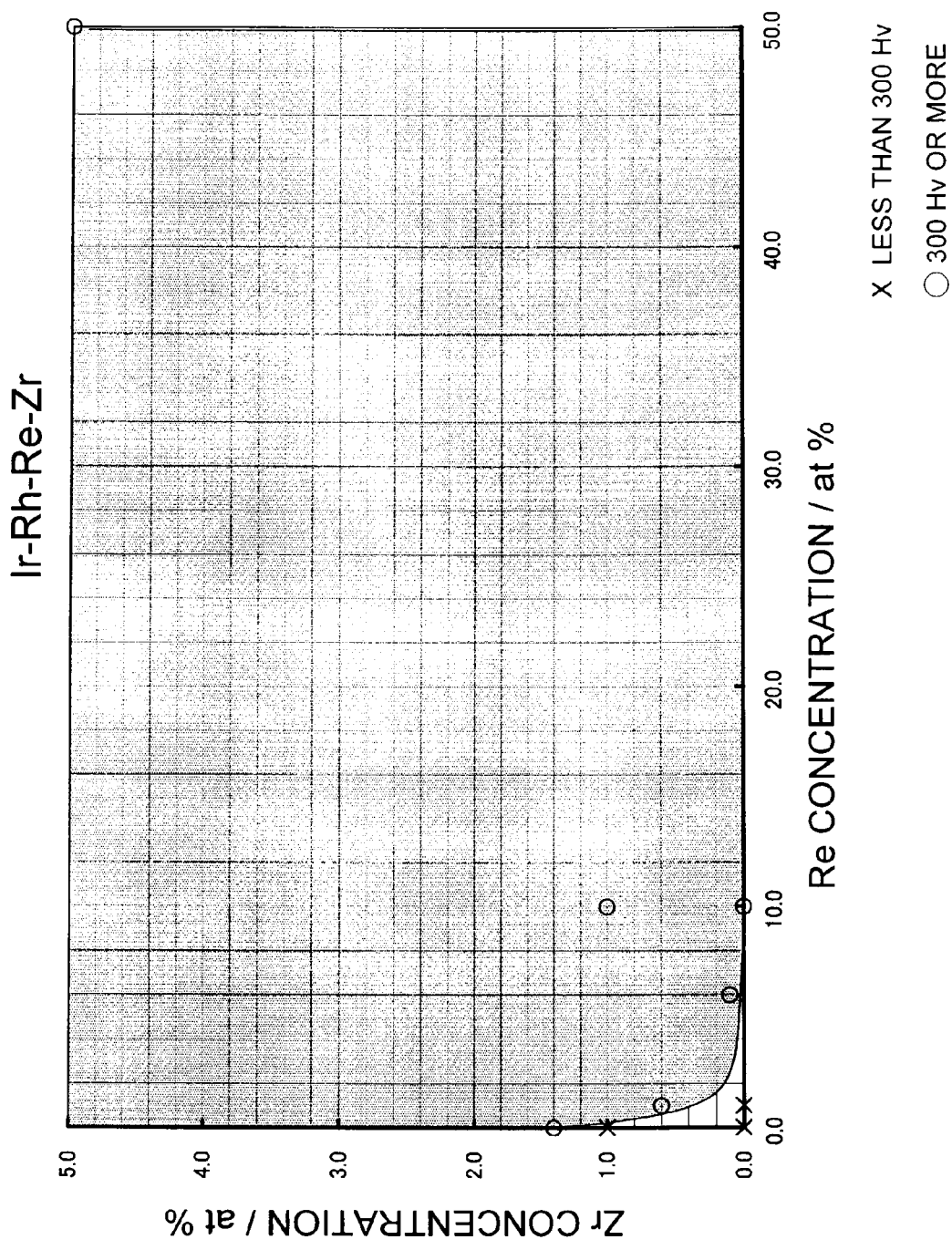
FIG. 13 is a graph showing a range of a composition of an Ir—Rh—Re—Zr-based alloy having a Micro Vickers Hardness of 300 Hv or more.

A relationship between a composition and a hardness of an Ir—Re—Zr—Rh-based alloy was examined. Alloys having compositions shown in Table 10 were formed as samples, and, as in the case of the Ir—Re—Zr-based alloy, Micro Vickers Hardnesses of the samples were measured after the alloys were solved and solidified. In the composition of the Ir—Re—Zr—Rh-based alloy, the composition of Rh was set to 17.2 atomic percentages in each of the samples. Measurement results are shown in Table 10. FIG. 13 shows a range (hatched region) of a composition having a Micro Vickers Hardness of 300 Hv or more. In FIG. 13, descriptions of a composition range having more than 50 atomic percentages of Re and a composition range having more than 5 atomic percentages of Zr are omitted. A relationship between a composition and a hardness of a binary iridium alloy was also examined.

TABLE 10

| Sample Number | Ir (atomic %) | Rh (atomic %) | Re (atomic %) | Zr (atomic %) | Micro Vickers Hardness (Hv) |
|---|---|---|---|---|---|
| 115 | 82.8 | 17.2 | 0.0 | 0.0 | 202.0 |
| 116 | 81.8 | 17.2 | 1.0 | 0.0 | 208.6 |
| 117 | 81.8 | 17.2 | 0.0 | 1.0 | 252.0 |
| 118 | 81.4 | 17.2 | 0.0 | 1.4 | 300.0 |
| 119 | 81.2 | 17.2 | 1.0 | 0.6 | 348.6 |
| 120 | 76.7 | 17.2 | 6.0 | 0.1 | 354.6 |
| 121 | 72.8 | 17.2 | 10.0 | 0.0 | 300.0 |
| 122 | 71.8 | 17.2 | 10.0 | 1.0 | 370.0 |
| 123 | 27.8 | 17.2 | 50.0 | 5.0 | 513.7 |

Referring to FIG. 13, improvement rates of Micro Vickers Hardnesses of Re and Zr to amounts of additive are different from each other. In order to obtain a Micro Vickers Hardness of 300 Hv or more, when the content of Zr is set to the lower limit, i.e., 0.1 atomic percentage, it is understood that 2.5 or more atomic percentages of Re may be contained in the sample. When the content of Re is set to the lower limit, i.e., 1.0 atomic percentage, it is understood that 0.4 or more atomic percentages of Zr may be contained in the sample. In a composition range having more than 50 atomic percentages of Re and a composition range having more than 5 atomic percentages of Zr, a volatilization loss may increase during frictional stirring, or the melting point may decrease.

In Table 2 to Table 10, there are alloys which have the same compositions and are commonly described. For descriptive convenience, different sample numbers are given to the alloys without giving the same sample numbers to the alloys. At this time, the Micro Vickers Hardnesses are equal to each other.

With respect to an Ir—W—Zr-base, an Ir—Nb—Zr-base, an Ir—Ta—Zr-base, an Ir—Rh—Zr-base, an Ir—W—Hf-base, an Ir—Nb—Hf-base, an Ir—Ta—Hf-base, an Ir—Rh—Hf-base, an Ir—Re—La-base, an Ir—Ru—La-base, an Ir—Mo—La-base, an Ir—W—La-base, an Ir—Nb—La-base, an Ir—Ta—La-base, an Ir—Rh—La-base, an Ir—Re—Ce-base, an Ir—Ru—Ce-base, an Ir—Mo—Ce-base, an Ir—W—Ce-base, an Ir—Nb—Ce-base, an Ir—Ta—Ce-base, an Ir—Rh—Ce-base, an Ir—Ru—Sm-base, an Ir—Mo—Sm-base, an Ir—W—Sm-base, an Ir—Nb—Sm-base, an Ir—Ta—Sm-base, an Ir—Rh—Sm-base, an Ir—Re—Gd-base, an Ir—Ru—Gd-base, an Ir—Mo—Gd-base, an Ir—W—Gd-base, an Ir—Nb—Gd-base, an Ir—Ta—Gd-base, an Ir—Rh—Gd-base, an Ir—Re—Sc-base, an Ir—Ru—Sc-base, an Ir—Mo—Sc-base, an Ir—W—Sc-base, an Ir—Nb—Sc-base, an Ir—Ta—Sc-base, an Ir—Rh—Sc-base, an Ir—Ru—Y-base, an Ir—Mo—Y-base, an Ir—W—Y-base, an Ir—Nb—Y-base, an Ir—Ta—Y-base, and an Ir—Rh—Y-base which serve as ternary alloys, the same tendencies as those about the relationships between the compositions and the Micro Vickers Hardnesses shown in FIGS. 5 to 12 were observed.

With respect to an iridium-rhenium-rhodium-hafnium-based alloy, an iridium-rhenium-rhodium-yttrium alloy, an iridium-rhenium-rhodium-scandium alloy, an iridium-molybdenum-rhodium-zirconium alloy, an iridium-molybdenum-rhodium-hafnium alloy, an iridium-molybdenum-rhodium-yttrium alloy, and an iridium-molybdenum-rhodium-scandium alloy, the same tendencies as those about the relationship between the compositions and the Micro Vickers Hardnesses shown in FIG. 13 were observed.

INDUSTRIAL APPLICABILITY

The friction stir welding tool according to the present invention can friction-stir-weld high-melting-point members.

The invention claimed is:

1. A friction stir welding tool which can friction-stir-weld a metal or alloy having a high melting point of 1350° C. or more as an object to be worked, wherein
at least a portion of the tool brought into contact with the object to be worked is formed by a ternary alloy comprising iridium, 1.0 to 50.0 atomic percentages of rhenium or ruthenium, and 0.1 to 5.0 atomic percentages of zirconium, hafnium, lanthanum, cerium, samarium, gadolinium, scandium, or yttrium, and
wherein the friction stir welding tool has a Micro Vickers Hardness of 300 Hv or more.

2. A friction stir welding tool which can friction-stir-weld a metal or alloy having a high melting point of 1350° C. or more as an object to be worked, wherein
at least a portion of the tool brought into contact with the object to be worked is formed by a ternary alloy comprising iridium, 1.0 to 35.0 atomic percentages of molybdenum, and 0.1 to 5.0 atomic percentages of zirconium, hafnium, lanthanum, cerium, samarium, gadolinium, scandium, or yttrium, and wherein the friction stir welding tool has a Micro Vickers Hardness of 300 Hv or more.

3. A friction stir welding tool which can friction-stir-weld a metal or alloy having a high melting point of 1350° C. or more as an object to be worked, wherein at least a portion of the tool brought into contact with the object to be worked is formed by a ternary alloy comprising iridium, 1.0 to 25.0 atomic percentages of niobium or tantalum, 0.1 to 5.0 atomic percentages of zirconium, hafnium, lanthanum, cerium, samarium, gadolinium, scandium, or yttrium, and wherein the friction stir welding tool has a Micro Vickers Hardness of 300 Hv or more.

4. A friction stir welding tool which can friction-stir-weld a metal or alloy having a high melting point of 1350° C. or more as an object to be worked, wherein at least a portion of the tool brought into contact with the object to be worked is formed by a quaternary alloy comprising iridium, 1.0 to 50.0 atomic percentages of rhenium or ruthenium, 1.0 to 18.0 atomic percentages of rhodium, and 0.1 to 5.0 atomic percentages of zirconium, hafnium, lanthanum, cerium, samarium, gadolinium, scandium, or yttrium, and wherein the friction stir welding tool has a Micro Vickers Hardness of 300 Hv or more.

5. A friction stir welding tool which can friction-stir-weld a metal or alloy having a high melting point of 1350° C. or more as an object to be worked, wherein at least a portion of the tool brought into contact with the object to be worked is formed by a quaternary alloy comprising iridium, 1.0 to 35.0 atomic percentages of molybdenum or tungsten, 1.0 to 18.0 atomic percentages of rhodium, and 0.1 to 5.0 atomic percentages of zirconium, hafnium, lanthanum, cerium, samarium, gadolinium, scandium, or yttrium, and wherein the friction stir welding tool has a Micro Vickers Hardness of 300 Hv or more.

6. A friction stir welding tool which can friction-stir-weld a metal or alloy having a high melting point of 1350° C. or more as an object to be worked, wherein at least a portion of the tool brought into contact with the object to be worked is formed by a quaternary alloy comprising iridium, 1.0 to 25.0 atomic percentages of niobium or tantalum, 1.0 to 18.0 atomic percentages of rhodium, and 0.1 to 5.0 atomic percentages of zirconium, hafnium, lanthanum, cerium, samarium, gadolinium, scandium, or yttrium, and wherein the friction stir welding tool has a Micro Vickers Hardness of 300 Hv or more.

7. A friction stir welding tool which can friction-stir-weld a metal or alloy having a high melting point of 1350° C. or more as an object to be worked, wherein at least a portion of the tool brought into contact with the object to be worked comprises at least iridium and rhodium, and a content of rhodium is 1.0 to 18.0 atomic percentages, and wherein the friction stir welding tool has a Micro Vickers Hardness of 300 Hv or more.

8. A friction stir welding method which brings objects to be worked into contact with each other and brings objects to be worked into almost contact with each other to regulate an elongate bonding region, moves a friction stir welding tool inserted into the bonding region while rotating the friction stir welding tool, and welds the objects to be worked, wherein the objects to be worked are formed by a metal or an alloy having a high melting point of 1350° C. or more, and, as the friction stir welding tool, the friction stir welding tool according to claim 1 is used.

9. The friction stir welding method according to claim 8, wherein welding is performed while applying an iridium back plate, said back plate having a composition comprising iridium and at least one of the group consisting of rhenium, ruthenium, molybdenum, tungsten, niobium, tantalum, rhodium, zirconium, and hafnium, as sub-components, or a back plate coated with an iridium film or a film having the composition to a rear surface side of a pressing surface of the friction stir welding tool.

10. A friction stir welding method which brings objects to be worked into contact with each other and brings objects to be worked into almost contact with each other to regulate an elongate bonding region, moves a friction stir welding tool inserted into the bonding region while rotating the friction stir welding tool, and welds the objects to be worked, wherein the objects to be worked are formed by a metal or an alloy having a high melting point of 1350° C. or more, and, as the friction stir welding tool, the friction stir welding tool according to claim 2 is used.

11. The friction stir welding method according to claim 10, wherein welding is performed while applying an iridium back plate, said back plate having a composition comprising iridium and at least one of the group consisting of rhenium, ruthenium, molybdenum, tungsten, niobium, tantalum, rhodium, zirconium, and hafnium, as sub-components, or a back plate coated with an iridium film or a film having the composition to a rear surface side of a pressing surface of the friction stir welding tool.

12. A friction stir welding method which brings objects to be worked into contact with each other and brings objects to be worked into almost contact with each other to regulate an elongate bonding region, moves a friction stir welding tool inserted into the bonding region while rotating the friction stir welding tool, and welds the objects to be worked, wherein the objects to be worked are formed by a metal or an alloy having a high melting point of 1350° C. or more, and, as the friction stir welding tool, the friction stir welding tool according to claim 3 is used.

13. The friction stir welding method according to claim 12, wherein welding is performed while applying an iridium back plate, said back plate having a composition comprising iridium and at least one of the group consisting of rhenium, ruthenium, molybdenum, tungsten, niobium, tantalum, rhodium, zirconium, and hafnium, as sub-components, or a back plate coated with an iridium film or a film having the composition to a rear surface side of a pressing surface of the friction stir welding tool.

14. A friction stir welding method which brings objects to be worked into contact with each other and brings objects to be worked into almost contact with each other to regulate an elongate bonding region, moves a friction stir welding tool inserted into the bonding region while rotating the friction stir welding tool, and welds the objects to be worked, wherein the objects to be worked are formed by a metal or an alloy having a high melting point of 1350° C. or more, and, as the friction stir welding tool, the friction stir welding tool according to claim 4 is used.

15. The friction stir welding method according to claim 14, wherein welding is performed while applying an iridium back plate, said back plate having a composition comprising iridium and at least one of the group consisting of rhenium, ruthenium, molybdenum, tungsten, niobium, tantalum, rhodium, zirconium, and hafnium, as sub-components, or a back plate coated with an iridium film or a film having the composition to a rear surface side of a pressing surface of the friction stir welding tool.

16. A friction stir welding method which brings objects to be worked into contact with each other and brings objects to be worked into almost contact with each other to regulate an elongate bonding region, moves a friction stir welding tool inserted into the bonding region while rotating the friction stir welding tool, and welds the objects to be worked, wherein
the objects to be worked are formed by a metal or an alloy having a high melting point of 1350° C. or more, and, as the friction stir welding tool, the friction stir welding tool according to claim 5 is used.

17. The friction stir welding method according to claim 16, wherein welding is performed while applying an iridium back plate, said back plate having a composition comprising iridium and at least one of the group consisting of rhenium, ruthenium, molybdenum, tungsten, niobium, tantalum, rhodium, zirconium, and hafnium, as sub-components, or a back plate coated with an iridium film or a film having the composition to a rear surface side of a pressing surface of the friction stir welding tool.

18. A friction stir welding method which brings objects to be worked into contact with each other and brings objects to be worked into almost contact with each other to regulate an elongate bonding region, moves a friction stir welding tool inserted into the bonding region while rotating the friction stir welding tool, and welds the objects to be worked, wherein
the objects to be worked are formed by a metal or an alloy having a high melting point of 1350° C. or more, and, as the friction stir welding tool, the friction stir welding tool according to claim 6 is used.

19. The friction stir welding method according to claim 18, wherein welding is performed while applying an iridium back plate, said back plate having a composition comprising iridium and at least one of the group consisting of rhenium, ruthenium, molybdenum, tungsten, niobium, tantalum, rhodium, zirconium, and hafnium, as sub-components, or a back plate coated with an iridium film or a film having the composition to a rear surface side of a pressing surface of the friction stir welding tool.

20. A friction stir welding method which brings objects to be worked into contact with each other and brings objects to be worked into almost contact with each other to regulate an elongate bonding region, moves a friction stir welding tool inserted into the bonding region while rotating the friction stir welding tool, and welds the objects to be worked, wherein
the objects to be worked are formed by a metal or an alloy having a high melting point of 1350° C. or more, and, as the friction stir welding tool, the friction stir welding tool according to claim 7 is used.

21. The friction stir welding method according to claim 20, wherein welding is performed while applying an iridium back plate, said back plate having a composition comprising iridium and at least one of the group consisting of rhenium, ruthenium, molybdenum, tungsten, niobium, tantalum, rhodium, zirconium, and hafnium, as sub-components, or a back plate coated with an iridium film or a film having the composition to a rear surface side of a pressing surface of the friction stir welding tool.

22. A friction stir welding tool which can friction-stir-weld a metal or alloy having a high melting point of 1350° C. or more as an object to be worked, wherein at least a portion of the tool brought into contact with the object to be worked is formed by a ternary alloy comprising iridium, 5.0 to 35.0 atomic percentages of tungsten, and 0.1 to 5.0 atomic percentages of zirconium, hafnium, lanthanum, cerium, samarium, gadolinium, scandium, or yttrium, and wherein the friction stir welding tool has a Micro Vickers Hardness of 300 Hv or more.

* * * * *